(12) United States Patent
Bots et al.

(10) Patent No.: US 11,072,203 B2
(45) Date of Patent: Jul. 27, 2021

(54) BICYCLE SPROCKET ASSEMBLY

(71) Applicant: SRAM, LLC, Chicago, IL (US)

(72) Inventors: Scott Bots, Colorado Springs, CO (US); Kevin Wesling, Lombard, IL (US)

(73) Assignee: SRAM, LLC, Chicago, IL (US)

( * ) Notice: Subject to any disclaimer, the term of this patent is extended or adjusted under 35 U.S.C. 154(b) by 325 days.

(21) Appl. No.: 16/109,271

(22) Filed: Aug. 22, 2018

(65) Prior Publication Data

US 2020/0062033 A1    Feb. 27, 2020

(51) Int. Cl.
| | |
|---|---|
| *B60B 27/04* | (2006.01) |
| *B60B 27/02* | (2006.01) |
| *B62M 9/10* | (2006.01) |
| *F16D 1/10* | (2006.01) |
| *F16H 57/00* | (2012.01) |
| *B60B 27/00* | (2006.01) |

(52) U.S. Cl.
CPC .......... *B60B 27/04* (2013.01); *B60B 27/0015* (2013.01); *B60B 27/023* (2013.01); *B62M 9/10* (2013.01); *F16D 1/10* (2013.01); *F16H 57/0018* (2013.01)

(58) Field of Classification Search
CPC .................................. B62M 9/10; B62M 9/12
USPC ....................................................... 474/160
See application file for complete search history.

(56) References Cited

U.S. PATENT DOCUMENTS

| | | | | |
|---|---|---|---|---|
| 3,513,725 | A | * | 5/1970 | Shimano Keizo ..... B62M 11/02 475/259 |
| 3,648,519 | A | * | 3/1972 | Nakata ..................... F16D 41/30 474/80 |
| 4,121,474 | A | * | 10/1978 | Arregui Suinaga .... F16D 41/30 474/160 |
| 6,176,798 | B1 | * | 1/2001 | Nakamura ............... B62M 9/10 474/160 |
| 6,428,437 | B1 | * | 8/2002 | Schlanger ................ B62M 9/10 474/160 |
| 6,619,639 | B1 | * | 9/2003 | Shelley ................... B60G 7/008 267/292 |
| 7,748,689 | B2 | * | 7/2010 | Thibault ............... F16F 1/3807 267/140.12 |
| 7,959,529 | B2 | * | 6/2011 | Braedt ..................... B62M 9/10 474/160 |
| 8,197,371 | B2 | * | 6/2012 | D'Aluisio ................ B62M 9/12 474/160 |

(Continued)

FOREIGN PATENT DOCUMENTS

WO      2018041409      3/2018

*Primary Examiner* — Henry Y Liu

(57) ABSTRACT

Example bicycle sprocket assemblies are described herein. An example sprocket assembly includes a cassette formed by a plurality of sprockets arranged in increasing diameter order from a first end to a second end of the cassette opposite the first end. The cassette has a passageway extending between a first opening in the first end and a second opening in the second end to receive a driver hub. An outboard portion of the passageway is formed between a midpoint of the cassette and the first end of the cassette. The cassette further includes a torque transmitting profile located within the outboard portion of the passageway to interface with the driver hub. The sprocket assembly also includes a bushing to be disposed within the second opening to form a non-torque transmitting interface between the second end of the cassette and the driver hub.

20 Claims, 20 Drawing Sheets

(56) References Cited

U.S. PATENT DOCUMENTS

| | | | | |
|---|---|---|---|---|
| 8,641,151 B2* | 2/2014 | Kamada | ................ | B62M 9/125 |
| | | | | 301/110.5 |
| 8,956,254 B2* | 2/2015 | Tokuyama | ............... | B62M 9/12 |
| | | | | 474/160 |
| 9,182,016 B2* | 11/2015 | Spahr | ...................... | B62M 9/10 |
| 9,533,735 B2* | 1/2017 | Braedt | .................... | F16H 9/24 |
| 9,902,463 B2* | 2/2018 | Braedt | .................... | B62M 9/10 |
| 10,752,320 B2* | 8/2020 | Oka | ..................... | B60B 27/023 |
| 2005/0058375 A1* | 3/2005 | Ma | ......................... | F16C 43/02 |
| | | | | 384/276 |
| 2005/0121219 A1* | 6/2005 | Pohl | ..................... | F16F 1/3835 |
| | | | | 174/650 |
| 2007/0210534 A1* | 9/2007 | Thibault | .............. | F16F 1/3807 |
| | | | | 277/632 |
| 2008/0231014 A1* | 9/2008 | Braedt | .................... | B62M 9/10 |
| | | | | 280/260 |
| 2009/0191996 A1* | 7/2009 | D'Aluisio | ............... | B62M 9/12 |
| | | | | 474/152 |
| 2010/0027924 A1* | 2/2010 | Wulf | .................... | F16F 1/3876 |
| | | | | 384/91 |
| 2011/0120232 A1* | 5/2011 | Lassanske | .......... | B60B 27/0068 |
| | | | | 73/862.29 |
| 2012/0302384 A1* | 11/2012 | Braedt | .................... | B62M 9/10 |
| | | | | 474/160 |
| 2013/0017914 A1* | 1/2013 | Braedt | ................... | F16D 1/108 |
| | | | | 474/160 |
| 2013/0225343 A1* | 8/2013 | Spahr | ................... | B60B 27/023 |
| | | | | 474/160 |
| 2019/0054765 A1* | 2/2019 | Thrash | ................. | B60B 27/023 |

\* cited by examiner

BICYCLE SPROCKET ASSEMBLY

FIELD OF THE DISCLOSURE

This disclosure relates generally to bicycle components and, more specifically, to bicycle sprocket assemblies.

BACKGROUND

Many bicycles include a sprocket assembly coupled to hub of a rear wheel of the bicycle. The sprocket assembly includes a cassette from by a plurality of sprockets (gears) of different diameters. A shifting device may be used to transfer a chain of the bicycle from one sprocket to another sprocket to change the gearing ratio of the bicycle. The sprockets are coupled together and rotate in unison. The cassette mounts to the hub of the rear wheel via a freewheel or ratchet.

SUMMARY

An example sprocket assembly disclosed herein includes a cassette formed by a plurality of sprockets arranged in increasing diameter order from a first end of the cassette to a second end of the cassette opposite the first end. The cassette has a passageway extending between a first opening in the first end and a second opening in the second end to receive a driver hub. The first and second openings are coaxial with a central axis of the cassette. An outboard portion of the passageway is formed between a midpoint of the cassette and the first end of the cassette, and an inboard portion of the passageway is formed between the midpoint of the cassette and the second end of the cassette. The cassette further includes a torque transmitting profile located within the outboard portion of the passageway to interface with the driver hub. The sprocket assembly also includes a bushing to be disposed within the second opening to form a non-torque transmitting interface between the second end of the cassette and the driver hub.

Disclosed herein is an example assembly to be mounted on a hub of bicycle. The assembly includes a sprocket assembly including a cassette formed by a plurality of sprockets arranged in increasing diameter order. The cassette has a passageway formed between a first opening in a first end of the cassette and a second opening in a second end of the cassette opposite the first end. The first and second openings are coaxial with a central axis of the cassette. The second opening in the second end of the cassette is defined by an inner peripheral edge. The cassette also includes a first keyed profile within the passageway to interface with a second keyed profile of a driver hub. The first keyed profile is located at or near the first opening. The sprocket assembly also includes a bushing to be disposed within the second opening. The bushing has a channel to receive the driver hub. An outer surface of the bushing and inner peripheral edge are smooth.

Disclosed herein is an example assembly to be mounted on a hub of bicycle. The assembly includes a driver hub having an outer surface and a sprocket assembly to transfer torque to the hub of the bicycle via the outer surface of the driver hub. The sprocket assembly includes a cassette formed by a plurality of sprockets. The cassette has a passageway formed between a first opening in a first end of the cassette and a second opening in a second end of the cassette opposite the first end. The driver hub is disposed within the passageway. The passageway includes a torque transmitting profile that mates with the outer surface of the driver hub. The second opening is defined by an inner peripheral edge. A diameter of the second opening is larger than a diameter of the outer surface along a section of the driver hub disposed within the second opening such that a space is formed between the inner peripheral edge and the outer surface of the driver hub. The sprocket assembly also includes means for filling at least some of the space between the inner peripheral edge of the second end and the outer surface of the driver hub.

Figure 1:
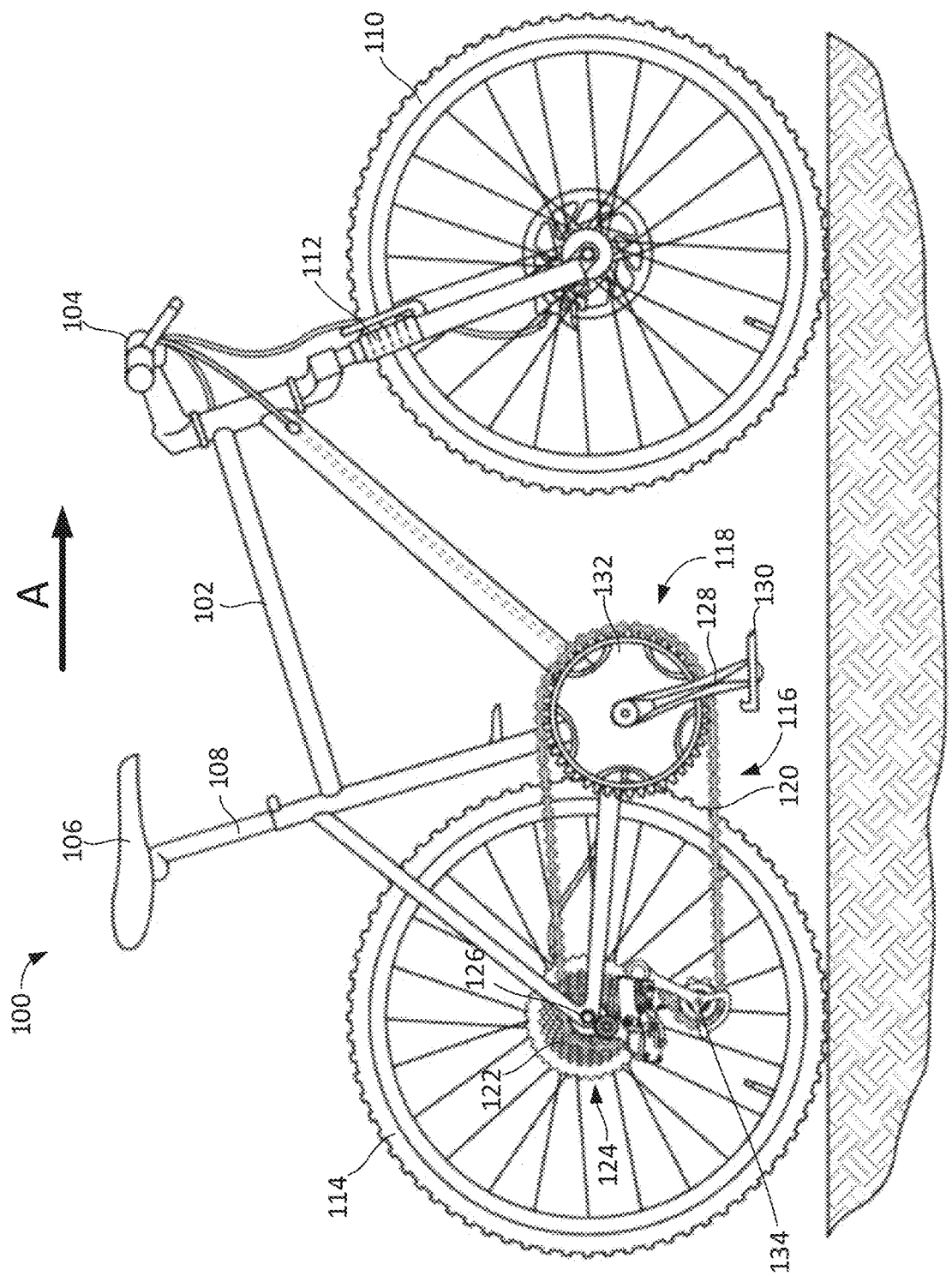
FIG. 1 is a side view of an example bicycle that may employ an example sprocket assembly constructed in accordance with the teachings of this disclosure.

The figures are not to scale. Instead, the thickness of the layers or regions may be enlarged in the drawings. In general, the same reference numbers will be used throughout the drawing(s) and accompanying written description to refer to the same or like parts. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. Stating that any part is in contact with another part means that there is no intermediate part between the two parts.

DETAILED DESCRIPTION

Disclosed herein are example sprocket assemblies for bicycles that include an interface member for providing a non-torque transmitting interface between a cassette and a driver hub disposed within an opening in the cassette. The interface member can be implemented as a bushing. Example bushings disclosed herein reduce or eliminate movement between the cassette and the driver hub, thereby reducing or eliminating potential wear and/or damage to the components of the sprocket assembly and/or other components of the bicycle. The example bushings disclosed herein also help to prevent foreign material (e.g., dirt, sand, etc.) from entering the space between the cassette and the driver hub, which further helps reduce or eliminate wear and/or damage to the components.

In general, a cassette is formed by or includes a plurality of sprockets (gears) that are arranged in an increasing or decreasing diameter order. In some examples, the cassette is formed by a single-piece conical shell, which integrates multiple ones of the sprockets. In other examples, the sprockets may be individual plates or disks that are coupled together via one or more fasteners (e.g., pins, screws, bolts, etc.). The cassette is driven by a chain on the bicycle. The cassette transfers torque to a driver hub, which transfers the torque to the wheel. A cassette typically includes a passageway formed between a first opening in a first end (the small diameter end) and a second opening in a second end (the large diameter end) to receive the driver hub. To enable the cassette to transfer torque and rotational motion to the driver hub, the cassette includes a torque transmitting profile, such as a keyed profile (e.g., splines). The torque transmitting profile is typically located in an outboard portion of passageway formed between a midpoint of the cassette and the first end (the smaller diameter end) of the cassette (e.g., the torque transmitting profile may be located at or near the first opening in the first end of the cassette). The driver hub is inserted into the cassette from the second opening and extends through the passageway toward the first opening. An outer surface of the driver hub includes a matching torque transmitting profile (e.g., splines) that mates with or engages the torque transmitting profile in the passageway of the cassette at or near the first end. Therefore, as the cassette is rotated, the torque and rotational motion is transferred to the driver hub. An end of the driver hub extends from the second end of the cassette and is engaged with a hub of the wheel (which forms a freewheel), thereby transferring the torque and rotational motion to the hub to rotate the wheel.

In known cassettes, the second opening in the second end (the large diameter end) of the cassette is not designed to transmit torque to the driver hub. Instead, an inner peripheral edge or surface that defines the second opening is typically smooth and is merely intended to engage the outer surface of the driver hub to support the second end of the cassette on the driver hub, but not transmit torque. However, due to manufacturing tolerances, it is often difficult to achieve a tightly fit interface between this inner peripheral edge of the second opening and the outer surface of the driver hub. In other words, the opening in the large end of the cassette is not exactly the same diameter as the outer diameter of the section of the driver hub disposed in the second opening. As a result, a gap or space exists between the inner peripheral edge of the second opening and the outer surface of the driver hub in the second opening. This gap or space induces instability into the system. In particular, because the cassette is supported and engaged with the driver hub through the torque transmitting profile, which is in the outboard portion (e.g., at or near the first end), the cassette may shift and/or wobble on the driver hub at the second end, especially when the chain is driving the larger sprockets on the cassette near the second end. This shifting and/or wobbling causes wear and/or damage to the parts of the assembly. Further, this gap or spacing allows foreign materials (e.g., dirt, sand, debris, etc.) to enter the passageway of the cassette and affect the interface between the cassette and the driver hub, thereby amplifying these adverse effects.

Disclosed herein are example sprocket assemblies that include an interface member, such as a spacer or bushing, to be used as a non-torque transmitting interface between the non-torque transmitting side of the cassette, such as the second end (the large diameter end) of the cassette, and the driver hub. The bushing fills the space or gap between the inner peripheral edge in the second end of the cassette and the outer surface of the driver hub and, thus, reduces or eliminates movement between the second end of the cassette and the driver hub. As a result, wear and/or damage is reduced or eliminated. Further, the example bushing prevents foreign material from entering the passageway through the second opening. In some examples, the bushing is constructed of a compliant (e.g., elastomeric, flexible, etc.) material, such as hardened rubber. Using a compliant material produces a relatively tight or sealed interface between the second end of the cassette and the driver hub. Thus, the example bushing increases safety (by reducing wear and/or damage to the parts) and increases the lifespan of the parts of the bicycle.

As disclosed above, the example bushings provide a non-torque transmitting interface between the cassette and the driver hub. In an example sprocket assembly, a bushing is be disposed in the second opening of the cassette. The bushing includes a channel or opening, and the driver extends through the bushing in the second opening and engages the torque transmitting profile at or near the first end of the cassette. Thus, the bushing is disposed between the inner peripheral edge that defines the second opening and the outer surface of the section of the driver hub disposed in the second opening. In some examples, an outer surface of the bushing is engaged with (in contact with) the inner peripheral edge that forms the second opening and an inner surface of the bushing is engaged with (in contact with) an outer surface of the driver hub, thereby filling the space that would otherwise exists between these two surfaces. In some examples, to achieve a non-torque transmitting interface, the interface between the inner peripheral edge and the bushing and/or the interface between the bushing and the driver hub form a slip fit (which allows contact between the parts with minimal friction that allows slipping). For example, the inner peripheral edge of the second opening and/or the outer surface of the bushing can be smooth (and/or do not include a keyed profile that mesh with each other). Additionally or alternatively, the inner surface of the bushing and/or the outer surface of the driver hub can be smooth. Therefore, the bushing is designed to minimize or eliminate torque transfer between the second end of the cassette and the driver hub such that no torque is transmitted between the second end of the cassette and the driver hub. As used herein, the terms "no torque," "non-torque transmitting" and variations thereof mean zero torque or only negligible torque that may result from static friction between two relatively smooth surfaces or other effects. In other words, some nominal or minimal torque may be transferred between the second end of the cassette and the driver hub from the static friction between the inner peripheral edge of the second opening and the bushing and/or between the bushing and the driver hub. However, this torque is negligible, and less than what would be required to drive a bicycle wheel under normal use. In particular, if the main torque transmitting profile (which is formed at or near the opposite side of the cassette) was omitted, this interface between the second end, the bushing, and the driver hub would slip and not enable proper torque transfer between the cassette and the driver hub.

Various example bushings are disclosed herein that may be implemented as the non-torque transmitting interface between the cassette and the driver hub. An example bushing disclosed herein is an elongated sleeve having a smooth outer surface. The sleeve is to be disposed within the second opening and extends into the passageway in the cassette. The driver hub extends through the sleeve in the second opening and engages the torque transmitting profile at or near the first end of the cassette. The smooth outer surface of the bushing engages the inner peripheral edge of the second opening. In some examples, an inner surface of bushing is also smooth and engages the outer surface of the driver hub. In other examples, the bushing includes splines (or another keyed profile) on the inner surface that engage the splines on the driver hub. However, because the inner peripheral edge of the second opening and the outer surface of the bushing are smooth, no torque is transferred through the bushing to the driver hub. In some examples, the bushing includes a flange extending radially outward from the outer surface of the sleeve at or near the end of the sleeve. The flange has a larger diameter than a diameter of the second opening and therefore prevents the bushing from moving too far into the passageway and out of the second opening.

Another example bushing disclosed herein is implemented as a ring. The ring is to be disposed in the second opening between the inner peripheral edge of the second opening and the outer surface of the driver hub. In some examples, an inner surface of the ring is smooth. In other examples, the ring includes splines (or another keyed profile) on the inner surface that engage the splines on the driver hub. However, similar to the sleeve disclosed above, the outer surface of the ring may be smooth and, thus, does not transmit torque between the second end of the cassette and the driver hub. In some examples, the outer surface of the ring includes an annular groove formed between two outwardly extending flanges. When the bushing is disposed in the second opening, the inner peripheral edge of the second opening extends into the annular groove, and the flanges extend outward and parallel to the opposite sides of the end sprocket (which forms the second end of the cassette). The flange prevents axial movement of the bushing in the second opening.

In other examples, other types of bushing or spacers may be utilized. Further, while many of the examples disclosed herein are described as forming a non-torque transmitting interface at the second end (the large diameter end) of the cassette, in other examples, the non-torque transmitting interface may be formed at the first end (the small diameter end) of the cassette. For example, the torque transmitting profile may instead be formed in the passageway at or near the second end (the large diameter end) of the cassette. In such an instance, an example bushing may be used to support the first end (the opposite end) of the cassette on the driver hub to provide stability and reduce or prevent movement between the first end of the cassette and the driver hub.

These and other examples are described with reference to various figures. It is understood that the figures and descriptions set out herein are provided for illustration only and do not limit the invention to the disclosed examples. For example, the terms "first" and "second," "front" and "rear," or "left" and "right" are used in the detailed description for the sake of clarity and not as terms of limitation. Moreover, the terms refer to bicycle mechanisms conventionally mounted to a bicycle and with the bicycle oriented and used in a standard fashion unless otherwise indicated.

FIG. 1 illustrates one example of a human powered vehicle on which the examples disclosed herein may be implemented. In this example, the vehicle is one possible type of bicycle 100, such as a mountain bicycle. The bicycle 100 has a frame 102, handlebars 104 near a front end of the frame 102, and a seat or saddle 106 for supporting a rider over a top of the frame 102. In the illustrated example, the saddle 106 is supported on a seat post 108. A front and/or forward riding direction or orientation of the bicycle 100 is indicated by the direction of the arrow A in FIG. 1. As such, a forward direction of movement for the bicycle 100 is indicated by the direction of arrow A.

In the illustrated example, the bicycle 100 has a first or front wheel 110 carried by a first or front suspension component, such as a front fork 112, and supporting a front end of the frame 102. The bicycle 100 also has a second or rear wheel 114 supporting a rear end of the frame 102. In some examples, the rear end of the frame 102 can be supported by a second or rear suspension component.

The bicycle 100 of FIG. 1 also has a drive train 116 with a crank assembly 118. The crank assembly 118 is operatively coupled via a chain 120 to a cassette 122 of a sprocket assembly 124. An example of the sprocket assembly 124 is disclosed in further detail below. The sprocket assembly 124 is part of an assembly that is mounted to a rear hub 126 providing a rotation axis of the rear wheel 114. The crank assembly 118 includes at least one, and typically two, crank arms 128 and pedals 130, along with at least one front sprocket, or chainring 132. A rear gear change device 134, such as a derailleur, is disposed at the rear wheel 114 to move the chain 120 through different sprockets of the cassette 122. In some examples, a front gear changer device is provided to move the chain 120 through multiple sprockets of the crank assembly 118.

While the bicycle 100 depicted in FIG. 1 is a mountain bicycle, the example assemblies and example bushings disclosed herein can be implemented on other types of bicycles. For example, the disclosed assemblies and bushings may be used on road bicycles, as well as bicycles with mechanical (e.g., cable, hydraulic, pneumatic, etc.) and non-mechanical (e.g., wired, wireless) drive systems. The example assemblies and bushings may also be implemented on other types of two-, three-, and four-wheeled human powered vehicles.

Figure 2:
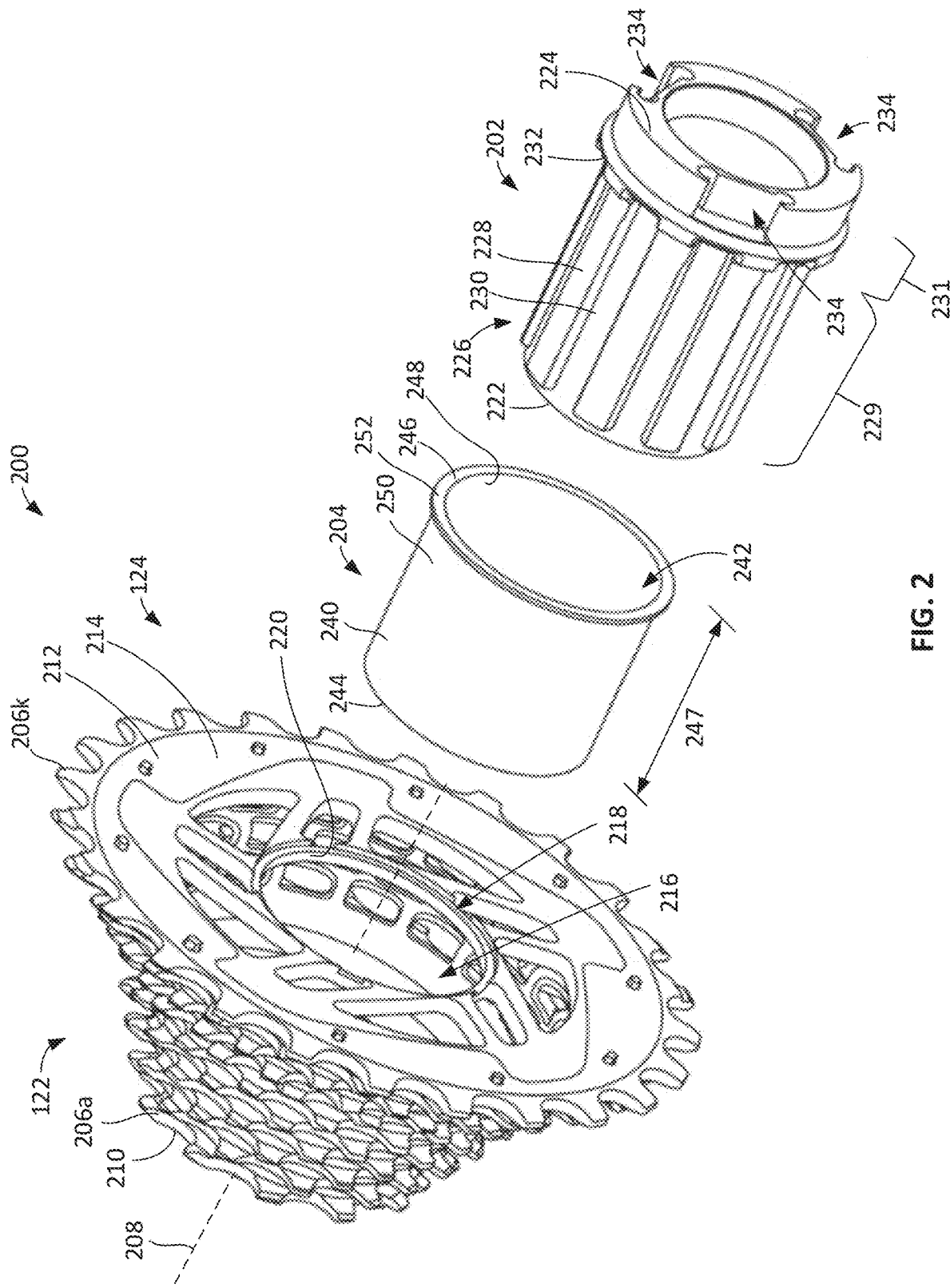
FIG. 2 is an exploded view of an example assembly including an example driver hub and an example sprocket assembly with an example cassette and an example bushing.

FIG. 2 is an exploded view of an example assembly 200 (which may be referred to as a wheel assembly) that may be implemented on the example bicycle 100 of FIG. 1. The assembly 200 is to be mounted on the rear hub 126 to transfer rotational power from the chain 120 (FIG. 1) to the rear wheel 114 (FIG. 1). In the illustrated example, the assembly 200 includes the sprocket assembly 124 and a driver hub 202 (which may be referred to as a driver body). The sprocket assembly includes the cassette 122 and an example bushing 204, which is disclosed in further detail herein. The driver hub 202 transfers torque from the cassette 122 to the rear hub 126 (FIG. 1) and, thus, to the rear wheel 114 of the bicycle.

Figure 3:
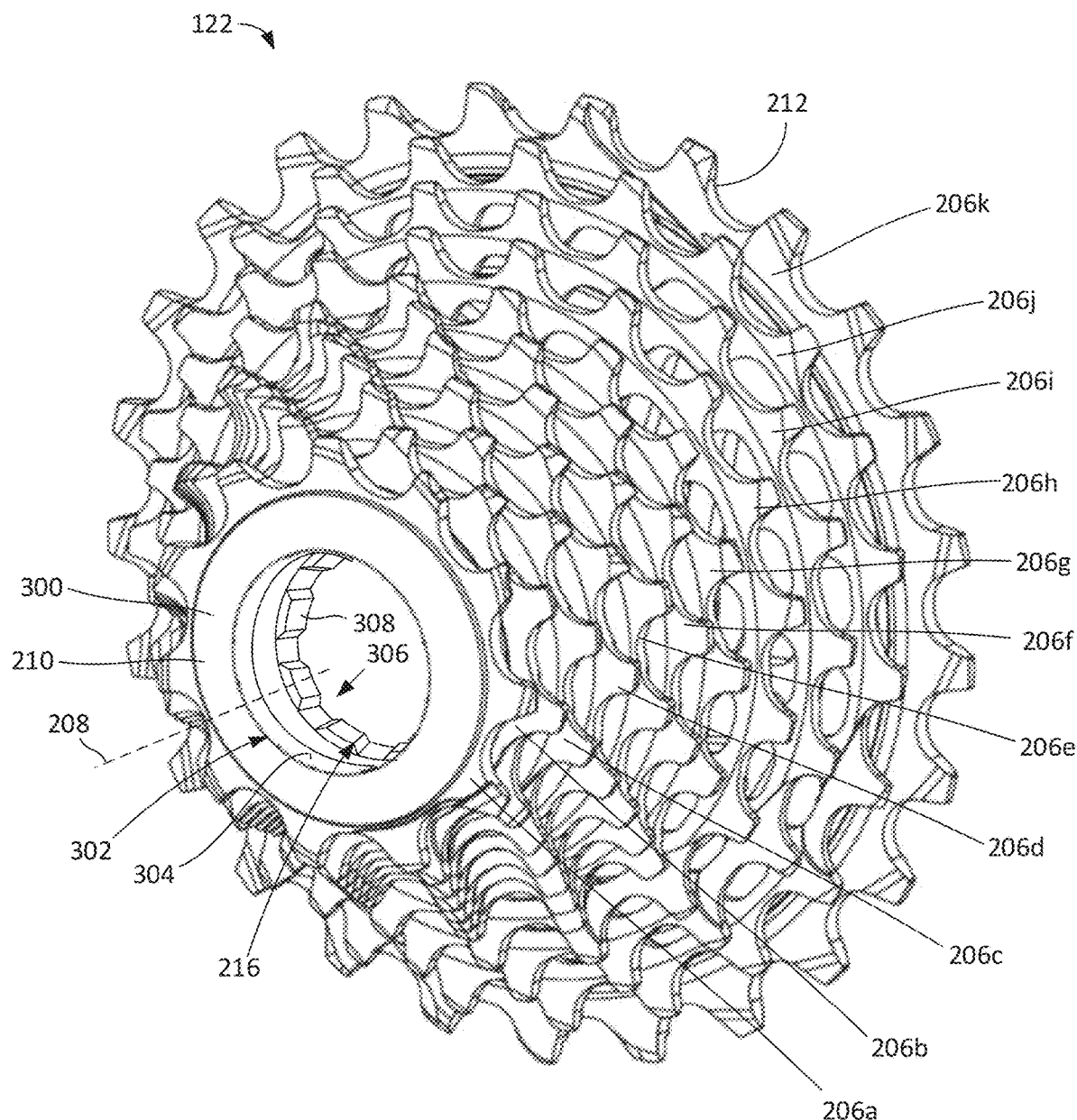
FIG. 3 is an isolated perspective view of the example cassette of FIG. 2.

FIG. 3 is a perspective view of the cassette 122 from the opposite side and is described in conjunction with FIG. 2. As shown in FIGS. 2 and 3, the cassette 122 is formed by a plurality of sprockets (sometimes referred to as gears). In this example, the cassette 122 includes eleven (11) sprockets, referenced as sprockets 206a-206k. All of the sprockets 206a-206k are labeled in FIG. 3. Only the first sprocket 206a and the eleventh sprocket 206k are labeled in FIG. 2. In other examples, the cassette 122 may include more sprockets (e.g., 12, 13, 14, etc.) or fewer sprockets (e.g., 1, 2, 3, 4, etc.). Each of the sprockets 206a-206k is a plate or disk with outwardly extending teeth. The sprockets 206a-206k are coupled to each other and rotate in unison as a single part or component. The rear gear change device 134 (FIG. 1) is used to move the chain 120 (FIG. 1) from one of the sprockets 206a-206k to another one of the sprockets 206a-206k to thereby change the gearing ratio between the chainring 132 (FIG. 1) and the rear wheel 114 (FIG. 1). In some examples, two or more of the sprockets 206a-206k are formed of a single-piece conical shell (e.g., a single piece of material), as discussed in further detail herein. In other examples, each of the sprockets 206a-206k may be a part that is coupled (e.g., via a fastening mechanism) to other ones of the sprockets 206a-206k.

As shown in FIGS. 2 and 3, the sprockets 206a-206k are arranged in a stacked configuration (e.g., orientated parallel to each other) and aligned along a central axis 208 of the cassette 122. The teeth of each of the sprockets 206a-206k extend radially from the central axis 208. The cassette 122 has a first end 210 and a second end 212 opposite the first end 210. The sprockets 206a-206k are arranged in an increasing diameter order from the first end 210 to the second end 212. As a result, the cassette 122 has a conical shape (sometimes referred to as a truncated conical shape because the conical shape does not end at a point). The first end 210 is formed by the sprocket with the smallest diameter and the fewest teeth, which, in this example, is the first sprocket 206a, and the second end 212 is formed by the sprocket with the largest diameter and the most teeth, which, in this example, is the eleventh sprocket 206k. In other examples, the cassette 122 may include more sprockets (e.g., 12, 13, 14, etc.) or fewer sprockets (e.g., 10, 9, 8, etc.). Therefore, in other examples, the second end 212 may correspond to another sprocket (e.g., a thirteenth sprocket). In this example, the first end 210 of the cassette 122 corresponds to an outer surface 300 (FIG. 3) of the first sprocket 206a and the second end 212 corresponds to an outer surface 214 (FIG. 2) of the eleventh sprocket 206k. When the assembly 200 is mounted on the rear hub 126 (FIG. 1), the second end 212 (the large end) of the cassette 122 faces the rear wheel 114, and the first end 210 (the small end) of the cassette 122 faces away from the rear wheel 114.

As shown in the illustrated example of FIGS. 2 and 3, the cassette 122 includes a passageway 216 extending through the cassette 122. The passageway 216 extends between a first opening 302 (FIG. 3) formed in the first end 210 of the cassette 122 (i.e., formed in the first sprocket 206a) and a second opening 218 (FIG. 2) formed in the second end 212 of the cassette 122 (i.e., formed in the eleventh sprocket 206k). As shown in FIG. 3, the first opening 302 is defined by a first inner peripheral edge 304 formed in the first end 210 (e.g., in the first sprocket 206a). Similarly, as shown in FIG. 2, the second opening 218 is defined by a second inner peripheral edge 220 formed in the second end 212 (e.g., in the eleventh sprocket 206k). The passageway 216 and the first and second openings 302, 218 are coaxial with the central axis 208. The central axis 208 also defines the rotational axis of the cassette 122.

The passageway 216 is to receive the driver hub 202. To transfer torque from the cassette 122 to the driver hub 202, the passageway 216 includes a torque transmitting profile, such as a keyed profile, that is to mate or engage a matching torque transmitting profile on the driver hub 202. For example, as illustrated in FIG. 3, the cassette 122 includes a first torque transmitting profile 306 formed in the passageway 216 near the first opening 302 in the first end 210. In this example, the first torque transmitting profile 306 is spaced apart from the first opening 302. In particular, as can be seen more clearly in FIG. 6 described below, the first torque transmitting profile 306 is axially located at or near the second and third sprockets 206b, 206c. However, in other examples, the first torque transmitting profile 306 can be located closer to or further from the first opening 302. In some examples, the first torque transmitting profile 306 is located or disposed at the first opening 302. For example, the first torque transmitting profile 306 can be formed in the first inner peripheral edge 304 in the first end 210 of the cassette 122. In this example, the first torque transmitting profile 306 is implemented as splines 308 (a first keyed profile). In other examples, the first torque transmitting profile 306 may be implemented as another type of keyed profile for providing a torque transmitting interface with the driver hub 202. The driver hub 202 is to be inserted into the passageway 216 from the second opening 218 and mate with the first torque transmitting profile 306 in the passageway 216. In this manner, torque and rotational motion of the cassette 122 are transferred to the driver hub 202 (and, thus, to the rear wheel 114 (FIG. 1)).

Referring to FIG. 2, the driver hub 202 includes a first end 222 and a second end 224 opposite the first end 222. The driver hub 202 includes a second torque transmitting profile 226, such as a second keyed profile, that mates with the first torque transmitting profile 306 (FIG. 3). In this example, the second torque transmitting profile 226 is implemented as splines 228 (one of which is referenced) formed on an outer surface 230 of the driver hub 202. When the driver hub 202 is disposed in the passageway 216, the splines 228 engage the splines 308 in the passageway 216 of the cassette 122. As a result, the cassette 122 and the driver hub 202 are keyed together and rotate in unison.

In the illustrated example, the driver hub 202 includes a first section 229 and a second section 231 having a larger diameter than the first section 229. When the assembly 200 is assembled, the first section 229 is disposed within the passageway 216 and the second section 231 remains outside of the passageway 216 near the second end 212. A lip 232 is formed in the outer surface 230 between the first section 229 and the second section 231. The second section 231 of the driver hub 202 includes a plurality of notches 234 to receive one or more springs or pawls. The springs or pawls extend outward and engage a toothed rim in a hub body of the rear hub 126 (thereby forming a freewheel), which enables the driver hub 202 to drive the rear wheel 114 (FIG. 1) when the rider is pedaling and enables the rear wheel 114 to rotate independent of the driver hub 202 when the rider is not pedaling (e.g., coasting). Therefore, any torque applied to any of the sprockets 206a-206k is transferred through the cassette 122 toward the first end 210 of the cassette 122 where the first torque transmitting profile 306 is located. The torque is transferred from the first torque transmitting profile 306 of the cassette 122 to the second torque transmitting profile 226 of the driver hub 202, which is near the first end 222 of the driver hub 202. Finally the torque is transferred from the first end 222 of the driver hub 202 to the second end 224 of the driver hub 202 that is engaged with the rear hub 126.

In this example, the cassette 122 does not include a torque transmitting profile (e.g., a keyed profile) at or near the second end 212. Instead, the second inner peripheral edge 220 of the second opening 218 is smooth. In known sprocket assemblies, this smooth inner peripheral edge 220 is intended to be sized to engage the outer surface 230 of the driver hub 202 to support the second end 212 on the driver hub 202 but not for transferring torque. However, due to manufacturing tolerances, it is often difficult to have achieve a tightly fit interface between this inner peripheral edge 220 and the outer surface 230 of the driver hub 202. As a result, a space or gap exists between this inner peripheral edge 220 and the outer surface 230 of the driver hub 202. This space or gap enables the second end 212 of the cassette 122 to shift or wobble on the driver hub 202 as torque is being transferred through the first torque transmitting profile 306 near the first end 210 (the opposite end). After time, this shifting or wobbling can cause wear or damage to the parts of the assembly 200. Therefore, in this example, the sprocket assembly 124 employs the example bushing 204 to fill any space or gap between the second inner peripheral edge 220 and the outer surface 230 of the driver hub 202, thereby creating a more stable support at the second end 212.

In the illustrated example of FIG. 2, the bushing 204 is implemented as an elongated sleeve 240 defining an opening or channel 242 between a first end 244 and a second end 246 opposite the first end 244. The sleeve has an axial length 247. The sleeve 240 has an inner surface 248 and an outer surface 250. In this example, the inner surface 248 and the outer surface 250 are smooth. When the assembly 200 is assembled, the bushing 204 is disposed within the second opening 218 of the passageway 216 and the driver hub 202 is disposed within and extends through the channel 242. The sleeve 240 fills at least some of the space between the second inner peripheral edge 220 of the second opening 218 and the outer surface 230 of the driver hub 202. In particular, the sleeve 240 has a diameter and thickness such that the outer surface 250 is engaged with (in contact with) the second inner peripheral edge 220 and the inner surface 248 is engaged with (in contact with) the outer surface 230 of the driver hub 202 (i.e., the outer surface of the splines 228) at the first section 229 of the driver hub 202 disposed within the second opening 218. As such, the bushing 204 prevents or reduces any wobble or radial movement between the second end 212 of the cassette 122 and the driver hub 202. In some examples, the bushing 204 is constructed of a softer material than the cassette 122 and the driver hub 202 (i.e., the bushing 204 may have a lower hardness than the cassette 122 and the driver hub 202). For example, the bushing 204 may be constructed of a flexible or compliant material, such as hardened rubber. In some examples, the bushing 204 is in a compressed state between the second inner peripheral edge 220 and the driver hub 202, which provides a relatively tight and sealed interface to support the second end 212 of the cassette 122.

In the illustrated example of FIG. 2, the sleeve 240 includes a flange 252 extending radially outward from the outer surface 250 at the second end 246. The flange 252 is to engage the second end 212 of the cassette 122 to prevent the sleeve 240 from moving toward the first end 210 of the cassette 122, as shown in more detail in connection with FIG. 6.

Figure 4:
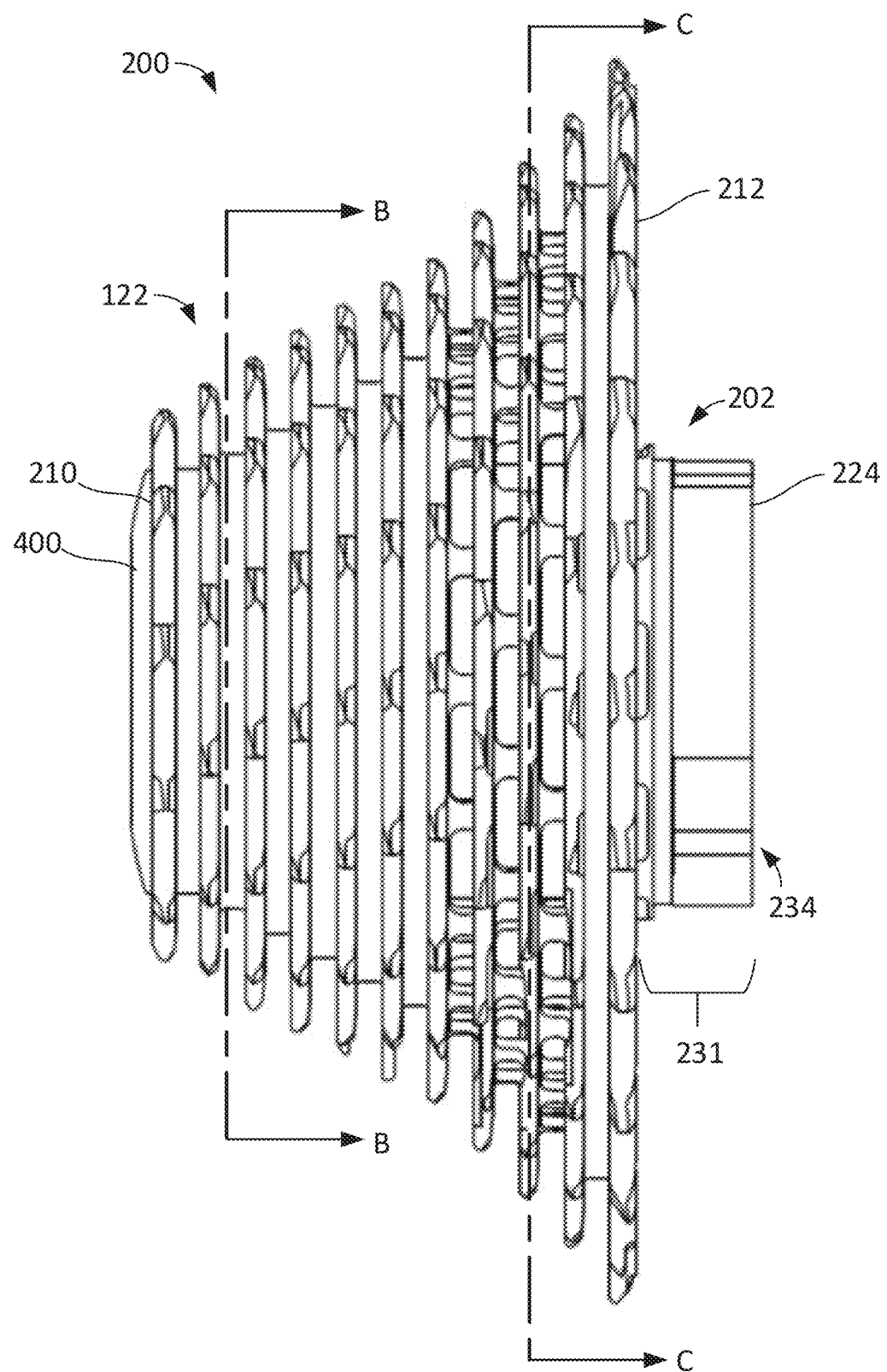
FIG. 4 is a side view of the example assembly of FIG. 2.
Figure 5:
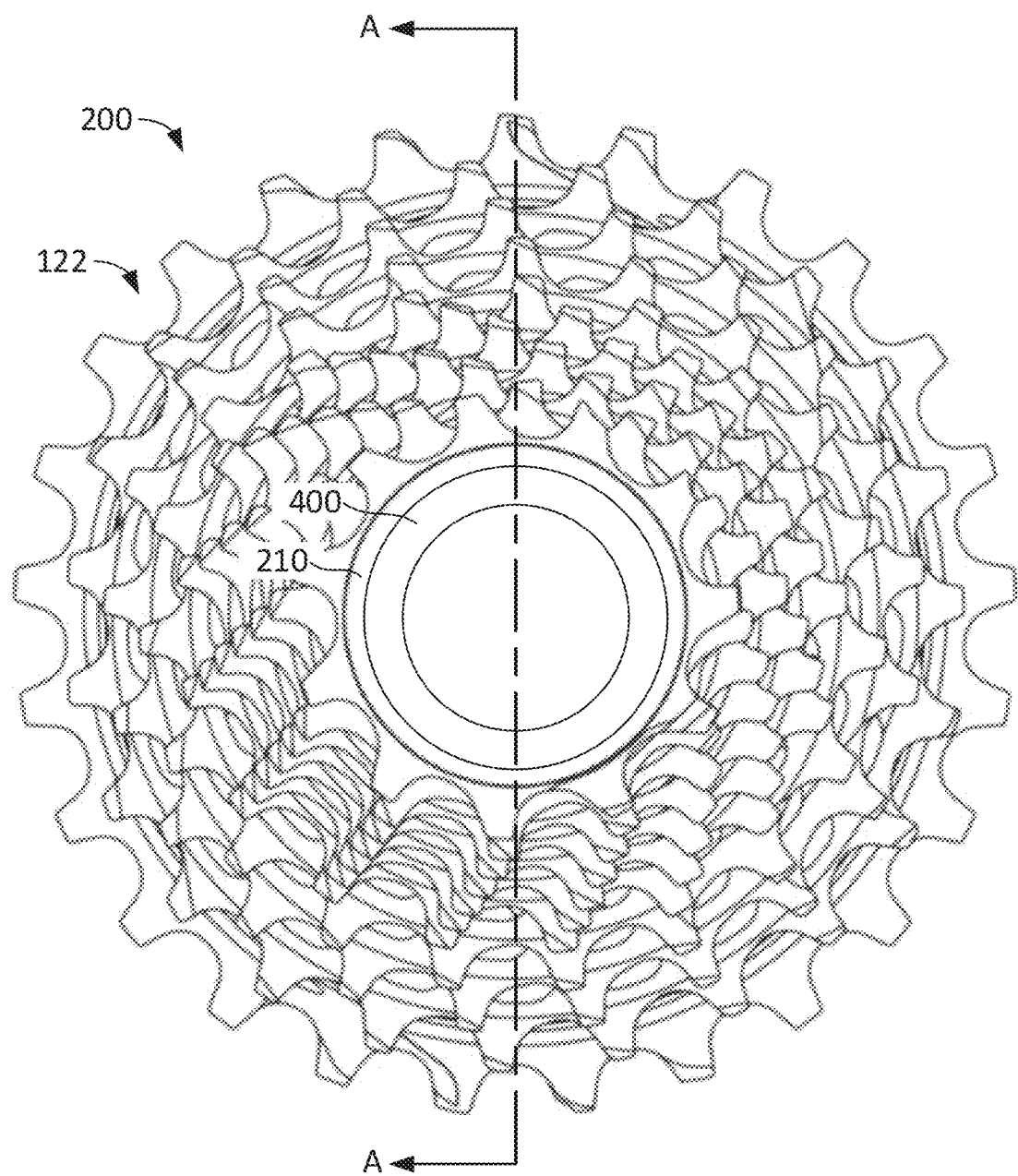
FIG. 5 is an end view of the example assembly of FIG. 2.

FIG. 4 is a side view of the assembly 200 in which the driver hub 202 is disposed in the passageway 216 (FIGS. 2 and 3) of the cassette 122. In the illustrated example, the assembly 200 includes a retaining ring 400, which is shown in further detail in connection with FIG. 6. The retaining ring 400 is disposed at the first end 210 of the cassette 122 and couples to the driver hub 202 within the passageway 216 (FIGS. 2 and 3) to prevent the driver hub 202 and the cassette 122 from being separated. When the assembly 200 is mounted on the bicycle 100 (FIG. 1), an axle of the rear hub 126 (FIG. 1) extends through the driver hub 202 (from the right side to the left side) and beyond the first end 210 of the cassette 122 where the axle is coupled to a fork or support structure on the frame 102 (FIG. 1). The second end 212 of the cassette 122 faces the rear wheel 114 (FIG. 1). The second section 231 and the second end 224 of the driver hub 202 are disposed outside of the cassette 122. When the assembly 200 is mounted on the bicycle 100, the second section 231 (which includes the notches 234 for the springs) extends into an opening in the rear hub 126 having angled teeth, thereby forming the freewheel. FIG. 5 is an end view of the assembly 200 from the first end 210 of the cassette 122. As shown in FIG. 5, the retaining ring 400 is inserted into the first opening 302 (FIG. 3).

Figure 6:
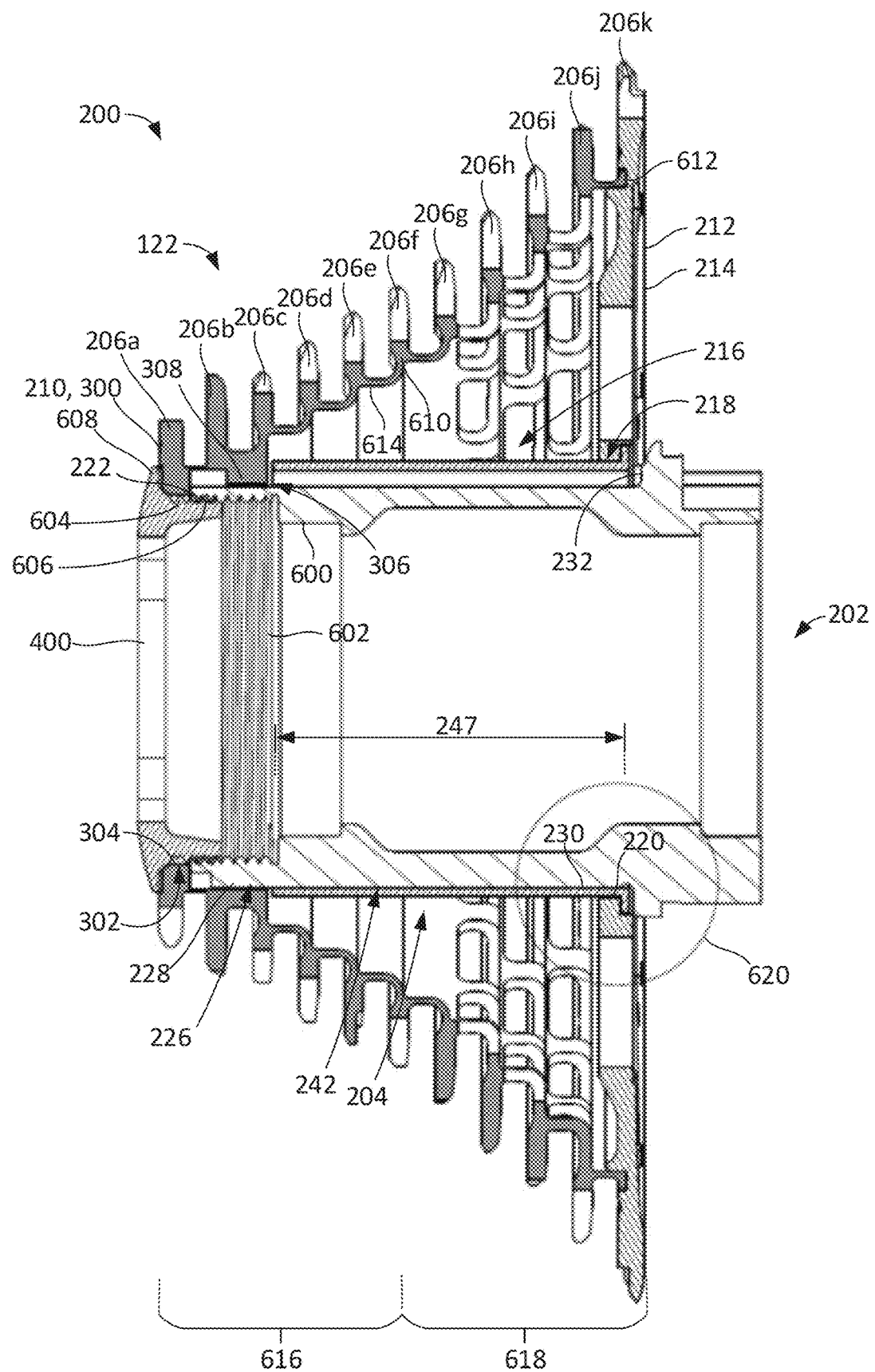
FIG. 6 is a cross-sectional view of the example assembly of FIG. 2 taken along line A-A of FIG. 5.

FIG. 6 is a cross-sectional view of the assembly 200 taken along line A-A of FIG. 5. As shown in FIG. 6, the driver hub 202 is disposed in the passageway 216 in the cassette 122. In some examples, the lip 232 on the driver hub 202 is engaged with the second end 212 of the cassette 122 (i.e., the outer surface 214 of the eleventh sprocket 206k) around the second opening 218, which prevents the driver hub 202 from moving further into the passageway 216. Additionally or alternatively, the first end 222 of the driver hub 202 may be engaged with an inner surface of the first sprocket 206a, as shown in FIG. 6. The splines 228 (one of which is referenced in FIG. 6) on the driver hub 202 are engaged with the splines 308 (one of which is referenced in FIG. 6) in the passageway 216 near the first end 222 of the driver hub 202, which enables the cassette 122 to transfer toque to the driver hub 202.

In the illustrated example, an inner surface 600 of the driver hub 202 includes threads 602. An outer surface 604 of the retainer ring 400 also includes threads 606 that mate with (are threaded into) the threads 602 of the driver hub 202 to couple the retainer ring 400 and the driver hub 202. In the illustrated example, the retainer ring 400 includes a flange 608 that engages the first end 210 of the cassette 122 (i.e., the outer surface 300 of the first sprocket 206a). As such, when the retainer ring 400 is coupled to the driver hub 202, the cassette 122 is axially clamped between the lip 232 on the driver hub 202 and the flange 608 on the retainer ring 400.

In the illustrated example of FIG. 6, the cassette 122 is formed by a single-piece conical shell 610 and the eleventh sprocket 206k (which may be referred to as an end sprocket). The single-piece conical shell 610 includes or integrates a subset of the sprockets 206a-206j. In particular, in this example, the first through tenth sprockets 206a-206j are formed as the single-piece conical shell 610. The single-piece conical shell 610 is formed from a single piece of material. Thus, at least a portion of the sprockets 206a-206k may be coupled without the use of fasteners. The eleventh sprocket 206k is coupled to a large end 612 of the single-piece conical shell 610, thereby forming the cassette 122. In other examples, the eleventh sprocket 206k may also be formed as part of the single-piece conical shell 610. In other examples, instead of having a single-piece shell forming a subset of the sprockets 206a-206k, each of the sprockets 206a-206k may be a separate sprocket, and the sprockets 206a-206k may be coupled to each other (e.g., to each adjacent sprocket) via one or more pins or other fasteners.

As shown in FIG. 6, the single-piece conical shell 610 includes an inner surface 614 that forms a conical cavity (which is part of the passageway 216). In this example, the first torque transmitting profile 306 is formed by the inner surface 614 of the shell 610 near the first opening 302. In particular, in this example, the first torque transmitting profile 306 is located in the passageway 216 between the second and third sprockets 206b, 206c. However, in other examples, the first torque transmitting profile 306 may be located closer to or further from the first opening 302 in the first sprocket 206a. For instance, as shown in FIG. 6, the passageway 216 has an outboard portion 616 formed between a midpoint of the cassette 122 (e.g., the sixth sprocket 206f) and the first end 210 of the cassette 122 and an inboard portion 618 formed between the midpoint of the cassette 122 and the second end 212 of the cassette 122. In some examples, the first torque transmitting profile 306 may be formed anywhere in the outboard portion 616. As an example, the first torque transmitting profile 306 may be formed in the first inner peripheral edge 304 of the first opening 302. In another example, the first torque transmitting profile 306 may be disposed further from the first end 210 in the passageway 216 (e.g., between the third and fourth sprockets 206c, 206d). Therefore, the cassette 122 is supported on the driver hub 202 in the outboard portion 616 of the passageway 216 via the first and second torque transmitting profiles 306, 226, and the cassette 122 is supported on the driver hub 202 via the bushing 204 in the inboard portion 618 of the passageway 216, thereby balancing the cassette 122 on the driver hub 202 to reduce or eliminate wobbling or relative movement.

As shown in FIG. 6, the bushing 204 is disposed in the passageway 216 and the driver hub 202 extends through the channel 242 in the bushing 204. The axial length 247 of the bushing 204 is less than a length of the passageway 216 (between the first end 210 and the second end 212 of the cassette 122). Further, the axial length 247 of the bushing 204 is less than a distance between the second end 212 of the cassette 122 and the first torque transmitting profile 306 in the passageway 216, such that the driver hub 202 can extend through channel 242 of the bushing 204 and beyond the first end 222 of the bushing 204 to mate with the first torque transmitting profile 306. Therefore, torque from the cassette 122 can be transferred to the driver hub 202 at the interface between the first torque transmitting profile 306 and the second torque transmitting profile 226 (which is near the first end 222 of the driver hub 202).

Figure 7:
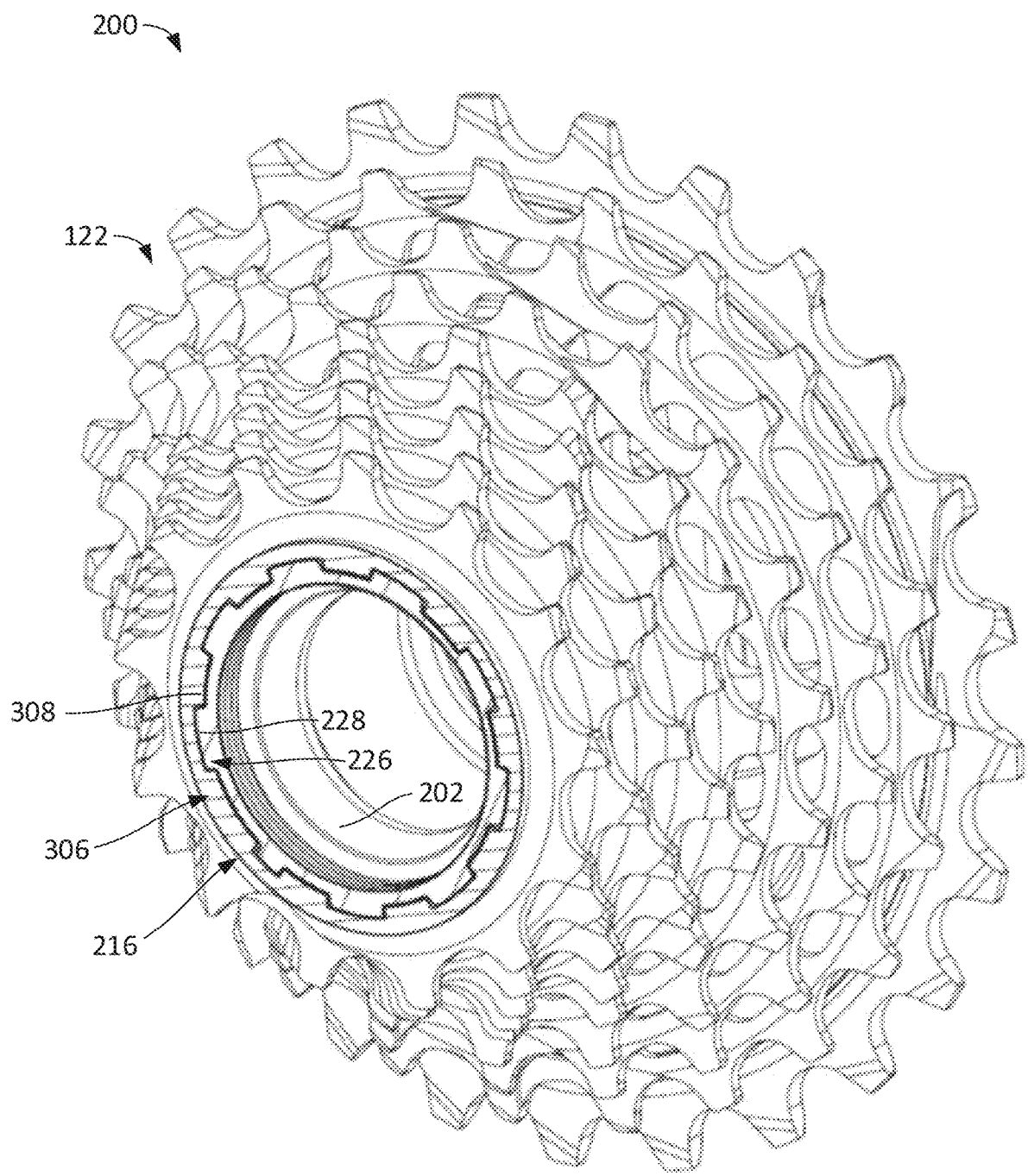
FIG. 7 is a perspective cross-sectional view of the example assembly of FIG. 2 taken along line B-B of FIG. 4.

FIG. 7 is a perspective cross-sectional view of the assembly 200 taken along line B-B of FIG. 4, which intersects the first and second torque transmitting profiles 306, 226. As shown in FIG. 7, the splines 228 on the driver hub 202 are engaged with the splines 308 formed in the passageway 216 of the cassette 122 (i.e., the splines 308 are disposed in grooves between the splines 228, and vice versa). As such, the driver hub 202 and the cassette 122 are keyed together.

Referring back to FIG. 6, as disclosed above, the diameter of the second opening 218 is larger than an outer diameter of the driver hub 202 (the outer diameter of the splines 228) at the section of the driver hub 202 disposed in the second opening 218. As such, a gap or space would be formed between the second inner peripheral edge 220 of the second opening 218 and the outer surface 230 of the splines 228 of the driver hub 202. Therefore, the bushing 204 is employed to fill at least some, if not all, of the space. As shown, the bushing 204 is disposed between the second inner peripheral edge 220 of the second opening 218 and the outer surface 230 of the splines 228 of the driver hub 202.

Figure 8:
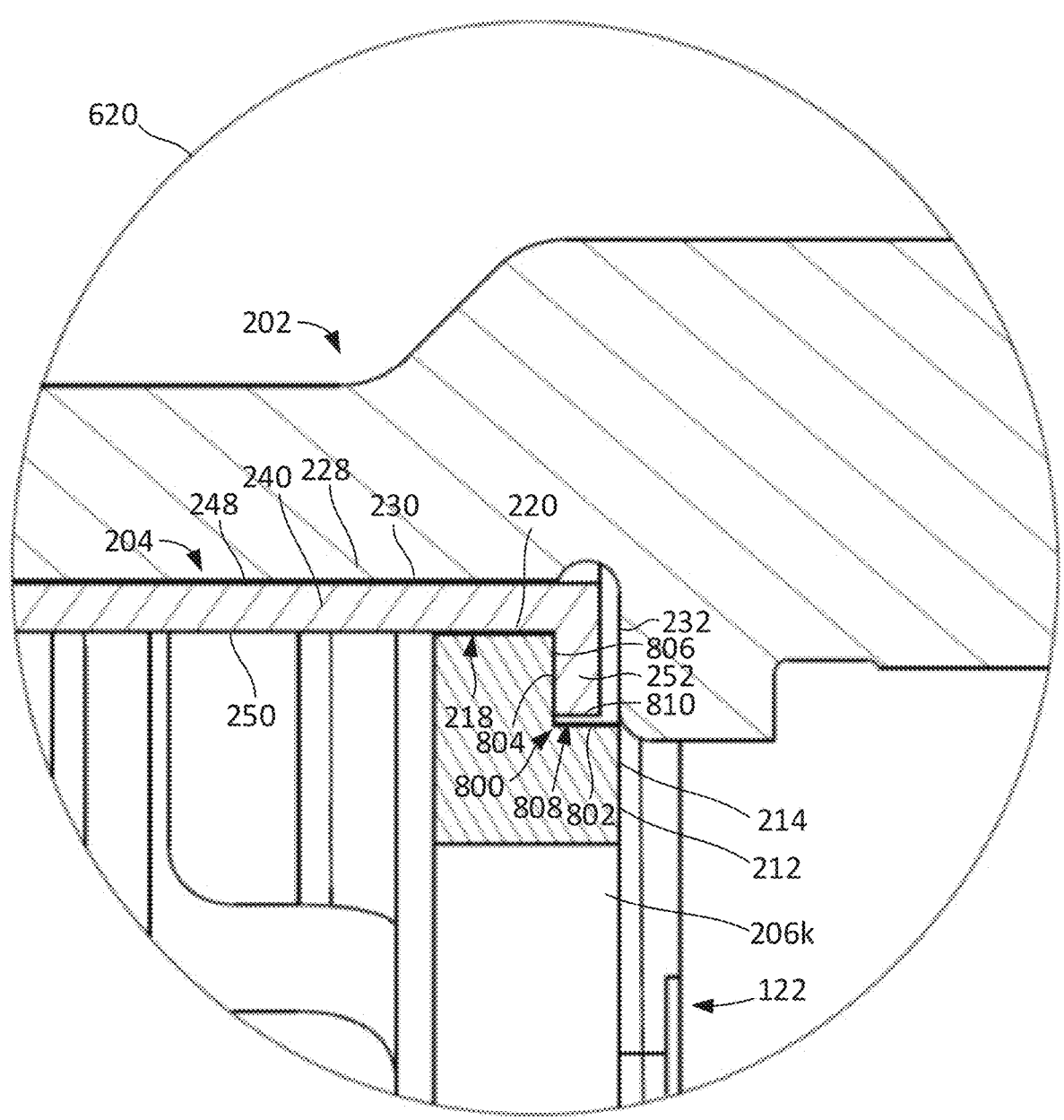
FIG. 8 is an enlarged view of the callout in FIG. 6.

FIG. 8 is an enlarged view of the callout 620 in FIG. 6. As shown in FIG. 8, the sleeve 240 fills the space between the second inner peripheral edge 220 of the second opening 218 and the outer surface 230 of the driver hub 202, thereby reducing or eliminating movement and/or wobble between the driver hub 202 and the cassette 122 at the second end 212. For example, as shown in FIG. 8, the sleeve 240 is sized such that the inner surface 248 is in contact with the outer surface 230 of the splines 228 of the driver hub 202, and the outer surface 250 is in contact with the second inner peripheral edge 220. As a result, the cassette 122 remains substantially axially aligned on the driver hub 202. In some examples, the bushing 204 is constructed of a compliant material and is placed in compression between the driver hub 202 and the second inner peripheral edge 220.

As shown in FIG. 8, the example bushing 204 includes the flange 252. The flange 252 has a larger diameter than the diameter of the second opening 218 and, thus, engages the second end 212 (i.e., the outer surface 214 of the eleventh sprocket 206k) to prevent the bushing 204 from moving further into the passageway 216. In the illustrated example, the flange 252 is disposed within a recess 800 formed in the outer surface 214 around the second opening 218. The recess 800 is defined by a step surface 802 (which extends axially) and an outward facing surface 804. In the illustrated example, an inner surface 806 of the flange 252 is engaged with the outward facing surface 804 of the recess 800, which prevents the bushing 204 from moving further into the passageway 216 (FIG. 2). In other examples, the inner surface 806 of the flange 252 may be spaced apart from the outward facing surface 804 of the recess 800. Further, in the illustrated example, a gap 808 is formed between an outer peripheral edge 810 of the flange 252 and the step surface 802 of the recess 800. In other examples, no gap may be formed. Instead, the outer peripheral edge 810 of the flange 252 may be engaged with the step surface 802. In other examples, the outer surface 214 may not include the recess 800. In the illustrated example, the lip 232 of the driver hub 202 is disposed outside of the flange 252, such that the flange 252 is disposed between (e.g., clamped or captured between) the outer surface 214 of the eleventh sprocket 206k and the lip 232 of the driver hub 202.

Figure 9A:
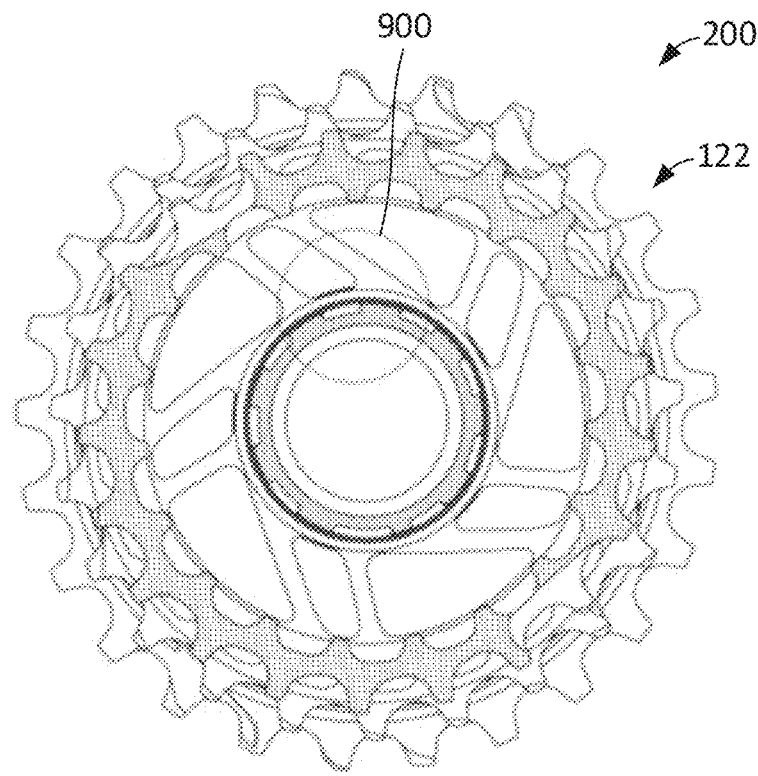
FIG. 9A is a cross-sectional view of the example assembly of FIG. 2 taken along line C-C of FIG. 4.
Figure 9B:
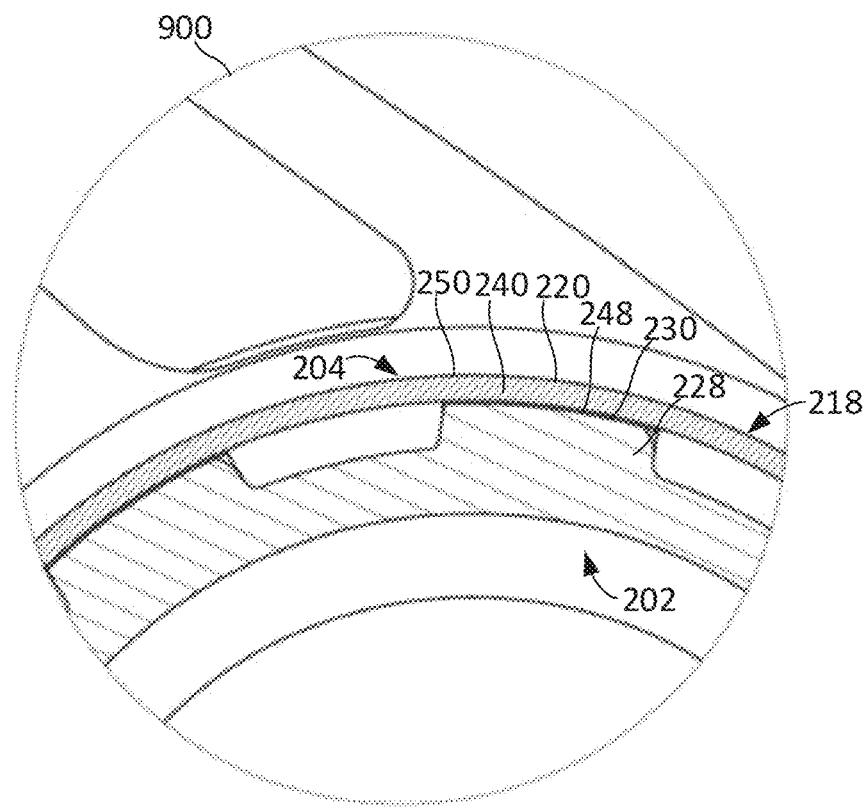
FIG. 9B is an enlarged view of the callout in FIG. 9A.

FIG. 9A is a cross-sectional view of the assembly 200 taken along line C-C from FIG. 4. An enlarged view of the callout 900 in FIG. 9A is shown in FIG. 9B. As shown in FIG. 9B, the outer surface 250 of the sleeve 240 is engaged with the second inner peripheral edge 220 of the second opening 218, and the inner surface 248 of the sleeve 240 is engaged with the outer surface 230 of the driver hub 202 (i.e., the outer surfaces of the splines 228). Thus, the bushing 204 fills at least some of the space between the second inner peripheral edge 220 and the outer surface 230 of the driver hub 202 (the outer surface 230 of the driver hub 202 between the splines 228 is still open). Therefore, the bushing 204 provides an interface between the second end 212 (FIG. 2) of the cassette 122 (FIG. 9A) and the driver hub 202. However, because the second inner peripheral edge 220 is smooth and the outer surface 250 of the sleeve 240 is smooth, the interface between the second inner peripheral edge 220 and the sleeve 240 forms a slip fit that minimizes or eliminates torque transfer. As such, any torque applied to the cassette 122 (FIG. 9A) is not transferred through the bushing 204 to the driver hub 202. Instead, the bushing 204 only helps support and stabilize the cassette 122 (FIG. 9A) on the driver hub 202, while the torque is transferred between the cassette 122 (FIG. 9A) and the driver hub 202 at the interface of the first torque transmitting profile 306 and the second torque transmitting profile 226, which is at or near the opposite side (the first end 210) of the cassette 122.

Figure 10:
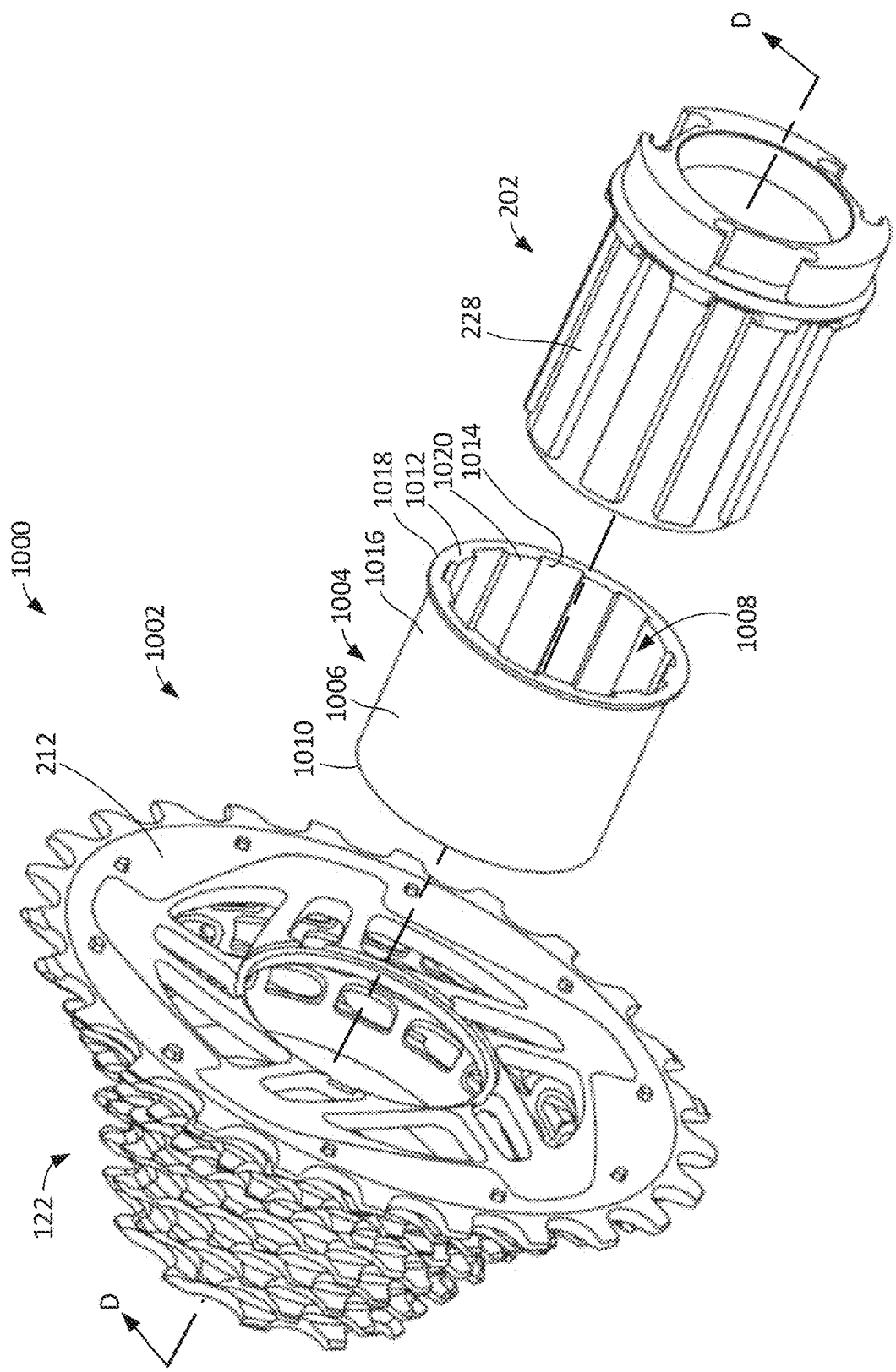
FIG. 10 is an exploded view of another example assembly including an example sprocket assembly with an alternative bushing.

FIG. 10 is an exploded view of another example assembly 1000 that may be implemented in connection with the example bicycle 100 of FIG. 1 and mounted on the rear hub 126. The assembly 1000 includes a sprocket assembly 1002 with an alternative bushing 1004 that may be used to form a non-torque transmitting interface between the second end 212 of cassette 122 and the driver hub 202. In the illustrated example, the bushing 1004 is implemented as an elongated sleeve 1006, similar to the bushing 204 of FIG. 2, and includes a channel 1008 defined between a first end 1010 and a second end 1012 opposite the first end 1010, an inner surface 1014, an outer surface 1016, and a flange 1018 extending radially outward from the outer surface 1016 at the second end 1012. However, unlike the sleeve 240 from FIG. 2 that has a smooth inner surface, the inner surface 1014 of the sleeve 1006 includes splines 1020 (one of which is referenced in FIG. 10). The splines 1020 are sized and shaped to mesh with the splines 228 on the driver hub 202. Therefore, when the driver hub 202 is inserted into the channel 1008 of the sleeve 1006, the splines 1020 mesh with the splines 228 of the driver hub 202. The splines 1020 fill more of the space between the second end 212 of the cassette 122 and the driver hub 202 and also help create a tighter interface or fit between the bushing 204 and the driver hub 202. However, because the outer surface 1016 of the sleeve 1006 is smooth, the sleeve 1006 does not transfer torque between the cassette 122 and the driver hub 202.

Figure 11:
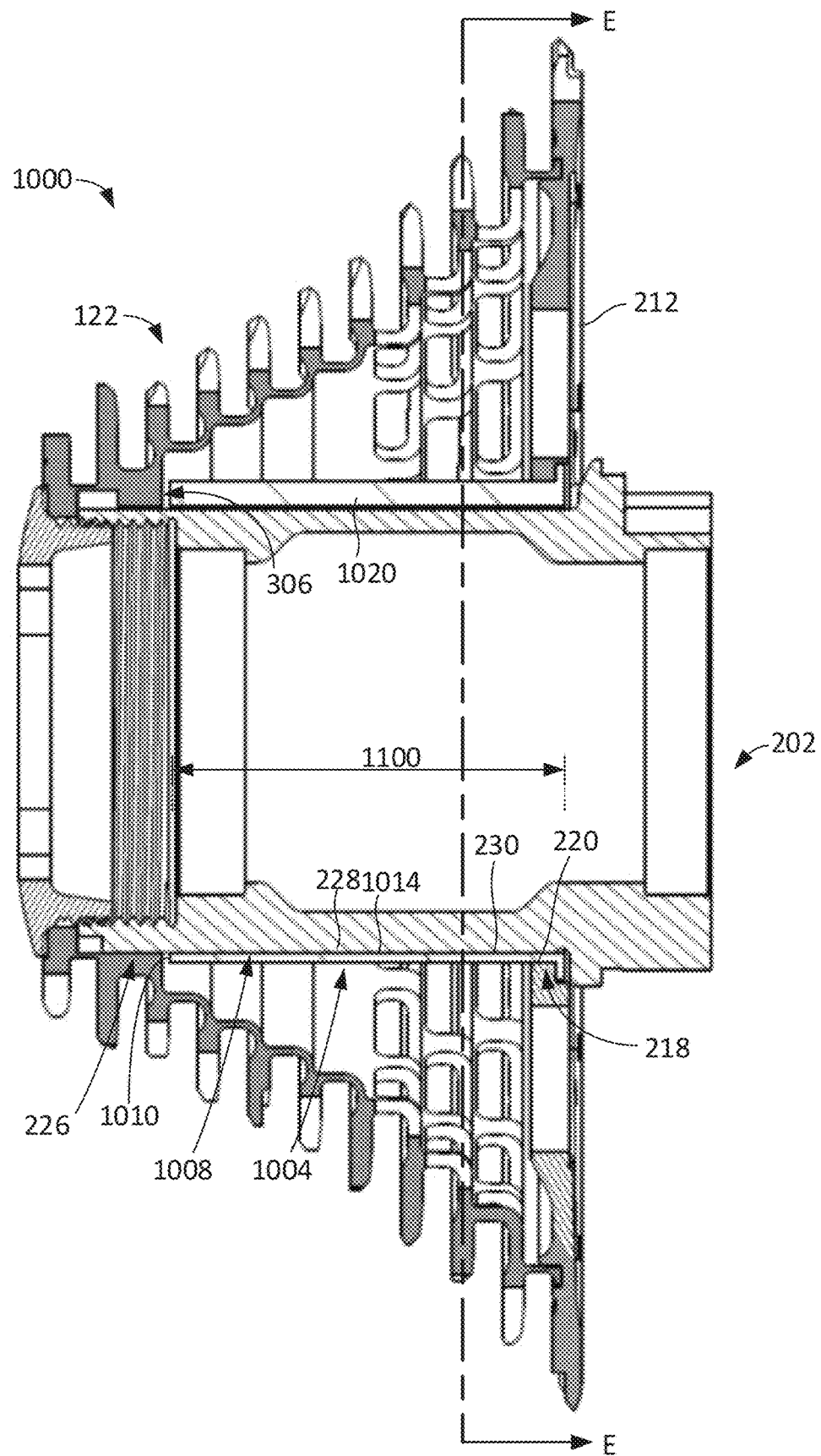
FIG. 11 is a cross-sectional view of the example assembly of FIG. 10 taken along line D-D of FIG. 10.

FIG. 11 is a cross-sectional view of the example assembly 1000 taken along line D-D of FIG. 10. Similar to the bushing 204 of FIG. 2, the bushing 1004 fills the gap between the second inner peripheral edge 220 of the second opening 218 and the outer surface 230 of the driver hub 202. Also similar to the bushing 204, an axial length 1100 of the bushing 1004 is less than a distance between the second end 212 of the cassette 122 and the first torque transmitting profile 306, such that the second torque transmitting profile 226 of driver hub 202 extends through channel 1008 of the bushing 1004 and beyond the first end 1010 of the bushing 1004 to mate with the first torque transmitting profile 306 of the cassette 122. Thus, torque can be transferred between the cassette 122 and the driver hub 202. In FIG. 11, the assembly 1000 is cross-sectioned along a plane where, in the bottom half of FIG. 11, one of the splines 228 of the driver hub 202 is disposed between two of the splines 1020 on the inner surface 1014 of the bushing 1004, and in the top half of the FIG. 11, one of the splines 1020 of the bushing 1004 is disposed between two of the splines 228 of the driver hub 202. The thickness of the bushing 1004 extends radially outward from the outer surface 230 of the splines 228 of the driver hub 202.

Figure 12A:
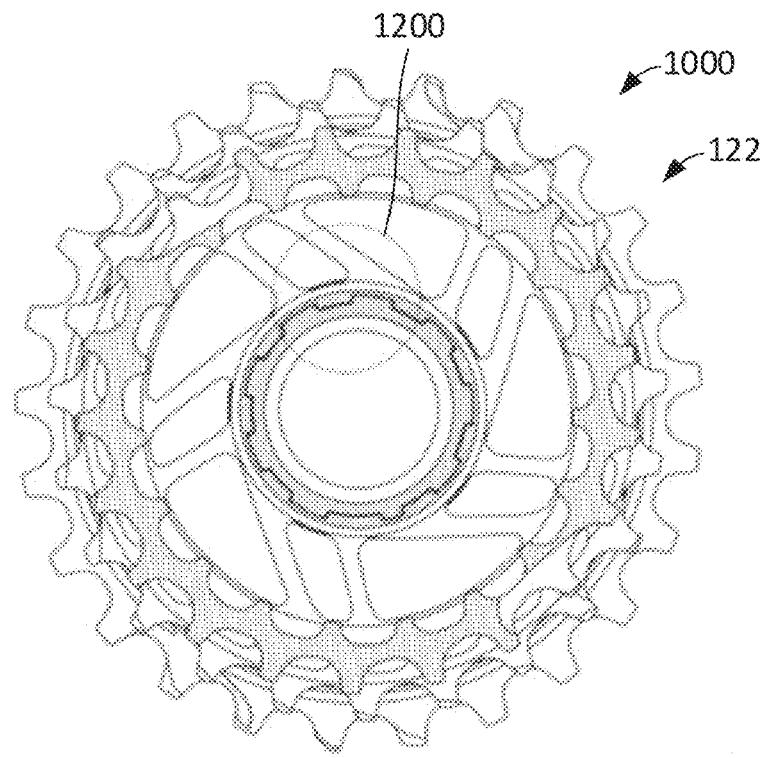
FIG. 12A is a cross-sectional view of the example assembly of FIG. 10 taken along line E-E of FIG. 11.
Figure 12B:
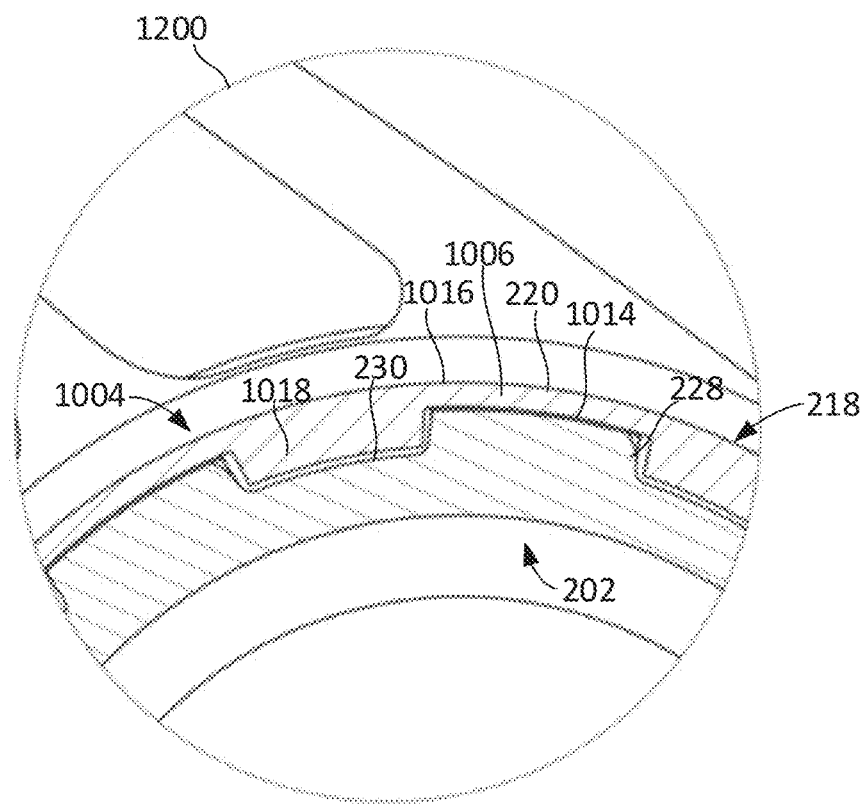
FIG. 12B is an enlarged view of the callout in FIG. 12A.

FIG. 12A is a cross-sectional view of the example assembly 1000 taken along line E-E of FIG. 11. An enlarged view of the callout 1200 in FIG. 12A is shown in FIG. 12B. As shown in FIG. 12B, the outer surface 1016 of the sleeve 1006 is engaged with the second inner peripheral edge 220 of the second opening 218. Further, the splines 1020 on the inner surface 1014 of the sleeve 1006 are meshed with the splines 228 on the outer surface 230 of the driver hub 202 and, thus, the inner surface 1014 of the sleeve 1006 (at the tops of the splines 1020 and/or in the grooves between the splines 1020) is engaged with the outer surface 230 of the driver hub 202 (at the tops of the splines 228 and/or in the grooves between the splines 228). Thus, the bushing 1004 provides an interface between the second end 212 (FIG. 2) of the cassette 122 (FIG. 12A) and the driver hub 202. However, because the second inner peripheral edge 220 is smooth and the outer surface 1016 of the sleeve 1006 is smooth, this interface forms a slip fit that does not transfer torque. As such, any torque applied to the cassette 122 (FIG. 12A) is not transferred through the bushing 1004 to the driver hub 202. Instead, the bushing 1004 only helps support and stabilize the cassette 122 (FIG. 12A) on the driver hub 202, while the torque is transferred between the cassette 122 (FIG. 12A) and the driver hub 202 at the interface of the first torque transmitting profile 306 (FIG. 3) and the second torque transmitting profile 226 (FIG. 2), which is at or near the opposite side (the first end 210) of the cassette 122 (FIG. 12A). In some examples, the bushing 1004 is constructed of a compliant material and is placed in compression between the driver hub 202 and the second inner peripheral edge 220.

Figure 13:
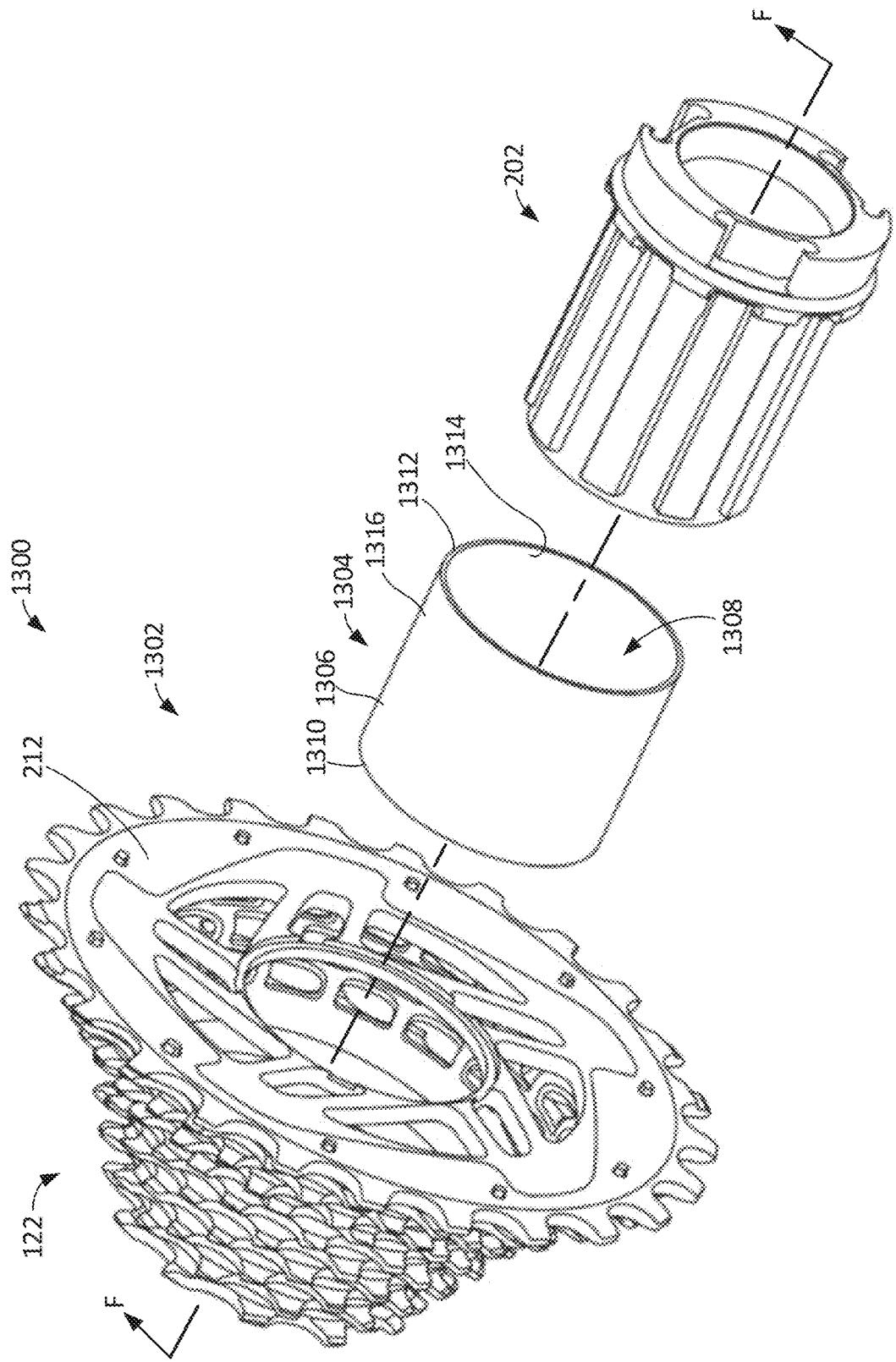
FIG. 13 is an exploded view of another example assembly including an example sprocket assembly with an alternative bushing.

FIG. 13 is an exploded view of another example assembly 1300 that may be implemented in connection with the example bicycle 100 of FIG. 1 and mounted on the rear hub 126. The assembly 1300 includes a sprocket assembly 1302 with an alternative bushing 1304 that may be used to form a non-torque transmitting interface between the second end 212 of cassette 122 and the driver hub 202. In this example, the bushing 1304 is implemented as an elongated sleeve 1306, similar to the bushing 204 of FIG. 2, and includes a channel 1308 defined between a first end 1310 and a second end 1312 opposite the first end 1310, an inner surface 1314, and an outer surface 1316. The inner surface 1314 of the sleeve 1306 is smooth. However, unlike the bushing 204 from FIG. 2, the bushing 1304 does not include a flange.

Figure 14:
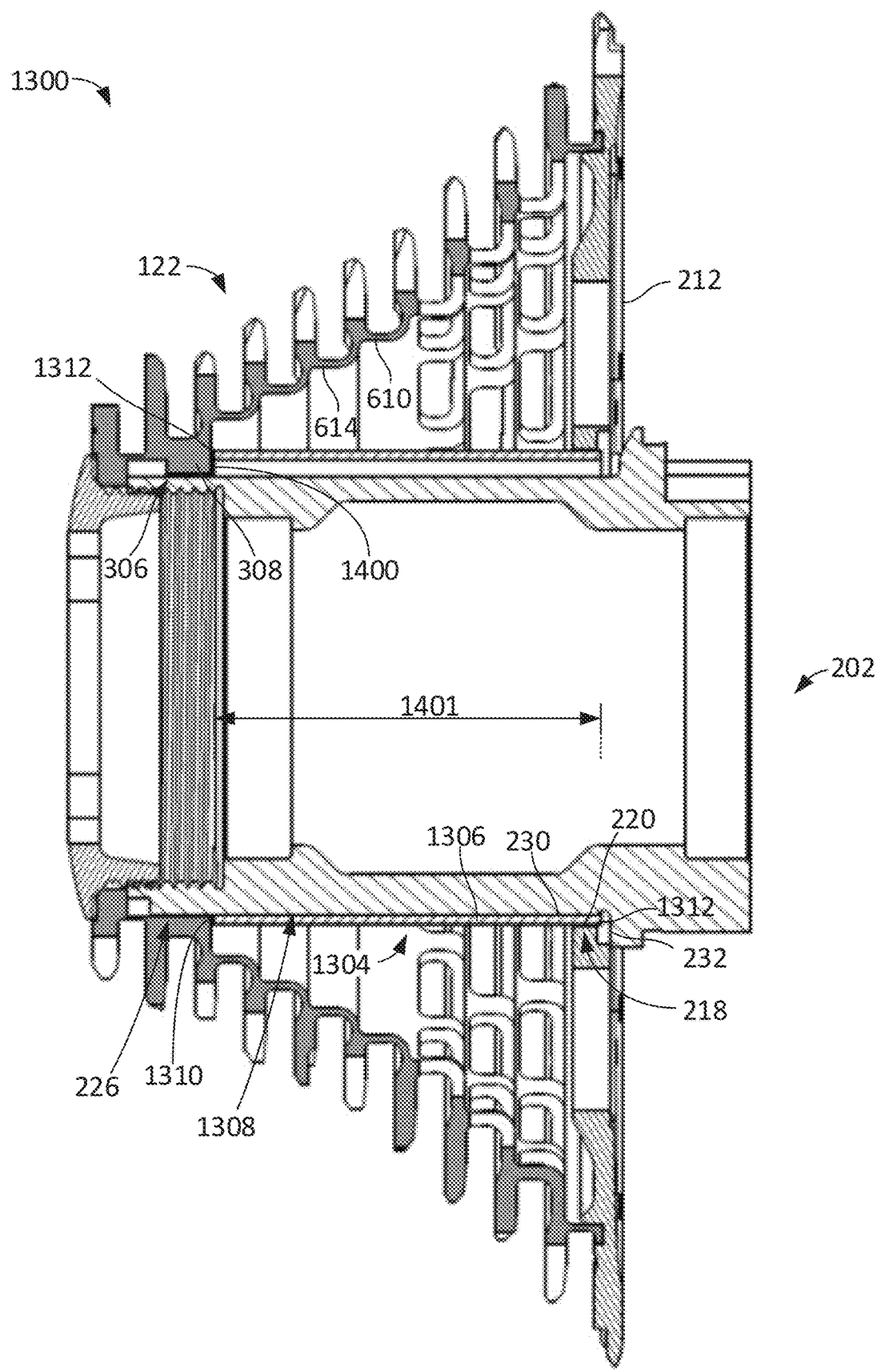
FIG. 14 is a cross-sectional view of the example assembly of FIG. 13 taken along line F-F of FIG. 13.

FIG. 14 is a cross-sectional view of the example assembly 1300 taken along line F-F of FIG. 13. Similar to the bushing 204, the bushing 1304 fills the gap between the second inner peripheral edge 220 of the second opening 218 and the outer surface 230 of the driver hub 202. Also similar to the bushing 204, an axial length 1401 of the bushing 1304 is less than a distance between the second end 212 of the cassette 122 and the first torque transmitting profile 306, such that the second torque transmitting profile 226 of driver hub 202 extends through channel 1308 of the bushing 1304 and beyond the first end 1310 of the bushing 1304 to mate with the first torque transmitting profile 306 of the cassette 122. Thus, torque can be transferred between the cassette 122 and the driver hub 202. In this example, the bushing 1304 does not include a flange at the second end 1312. However, once the assembly 1300 is assembled, the sleeve 1306 is axially confined between the lip 232 of the driver hub 202 and a step 1400 that forms the splines 308 in the inner surface 614 of the single-piece conical shell 610. In the illustrated example, a small gap is shown between the second end 1312 of the sleeve 1306 and the lip 232 of the driver hub 202. In other examples, the sleeve 1306 may be sized such that no gap is formed (i.e., the first end 1312 of the sleeve 1306 is in contact with the step 1400 and the second end 1312 of the sleeve 1306 is in contact with the lip 232 of the driver hub 202). If a cross-section was taken along the same plane as in FIG. 9A (i.e., line C-C of FIG. 4), the example bushing 1304 would appear the same as shown in FIGS. 9A and 9B. In particular, the outer surface 1316 of the sleeve 1306 is in contact with the second inner peripheral edge 220 of the second opening 218, and the inner surface 1314 of the sleeve 1306 is contact with the outer surface 230 of the driver hub 202 (i.e., the outer surfaces of the splines 228). In this example, because the inner surface 1314 and the outer surface 1316 of the sleeve 1306 are smooth, slip fit interfaces are formed between the second inner peripheral edge 220 and the bushing 1304, and between the bushing 1304 and the driver hub 202. In some examples, the bushing 1304 is constructed of a compliant material and is placed in compression between the driver hub 202 and the second inner peripheral edge 220.

Figure 15:
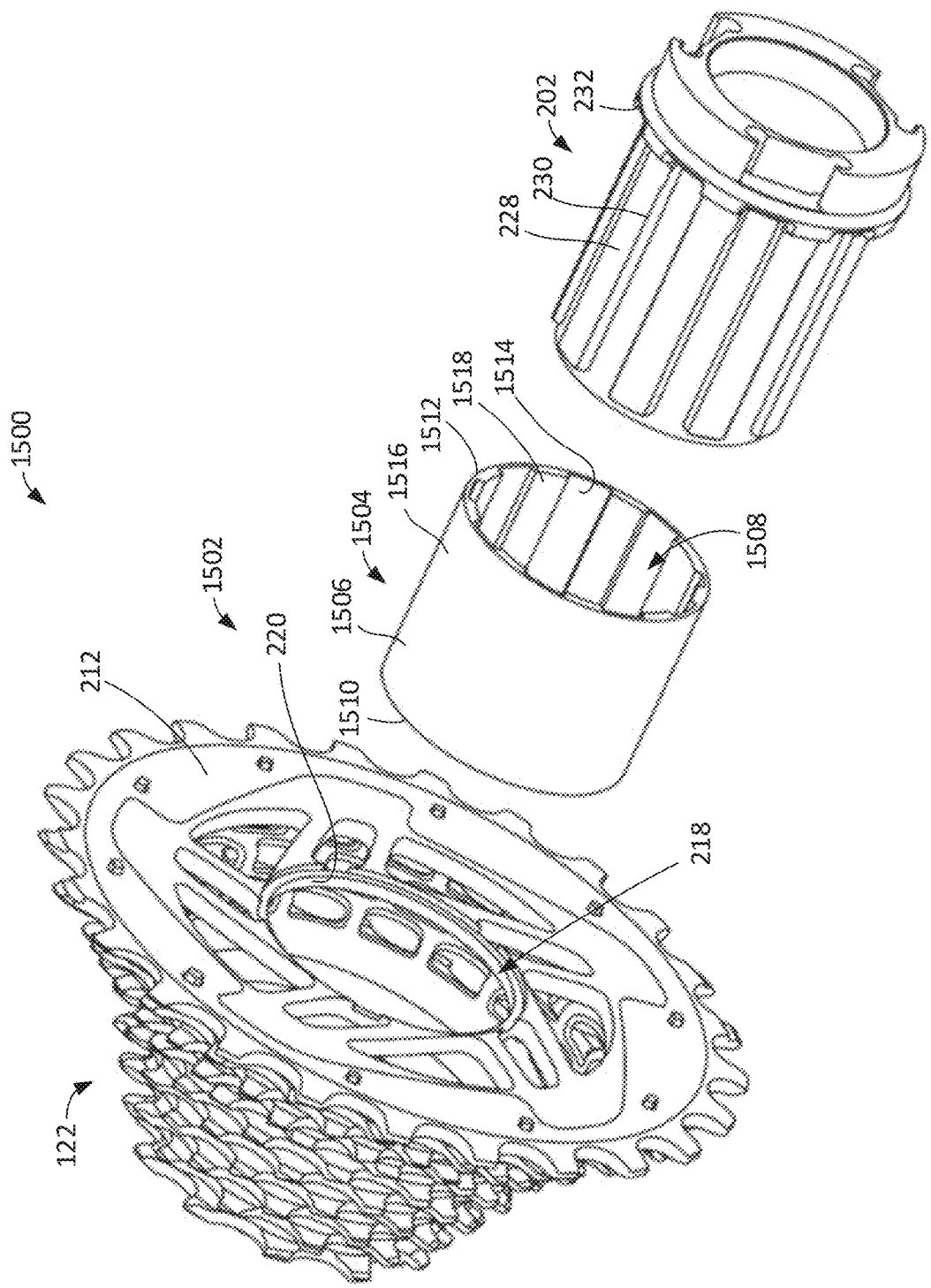
FIG. 15 is an exploded view of another example assembly including an example sprocket assembly with an alternative bushing.

FIG. 15 is an exploded view of another example assembly 1500 that may be implemented in connection with the example bicycle 100 and mounted on the rear hub 126. The assembly 1500 includes a sprocket assembly 1502 with an alternative bushing 1504 that may be used to form a non-torque transmitting interface between the second end 212 of cassette 122 and the driver hub 202. In this example, the bushing 1504 is similar to the bushing 1004 of FIG. 10 and is implemented as an elongated sleeve 1506 having a channel 1508 defined between a first end 1510 and a second end 1512 opposite the first end 1510, an inner surface 1514, an outer surface 1516, and splines 1518 formed in the inner surface 1514 (one of which is reference in FIG. 15). The splines 1518 are sized and shaped to mesh with the splines 228 on the driver hub 202. Therefore, when the driver hub 202 is inserted into the channel 1508 of the sleeve 1506, the splines 1518 mesh with the splines 228 of the driver hub 202. If a cross-section was taken along the same plane as in FIG. 12A (i.e., line E-E of FIG. 11), the example bushing 1504 would appear the same as the bushing 1004 shown in FIGS. 12A and 12B. The bushing 1504 fills the gap between the second inner peripheral edge 220 of the second opening 218 and the outer surface 230 of the driver hub 202. However, unlike the bushing 1004 from FIG. 10, the bushing 1504 does not include a flange. Similar to the bushing 1304 shown in FIG. 14, the bushing 1504 is captured between the step 1400 (FIG. 14) in the cassette 122 and the lip 232 of the driver hub 202. In some examples, the bushing 1504 is constructed of a compliant material and is placed in compression between the driver hub 202 and the second inner peripheral edge 220.

Figure 16:
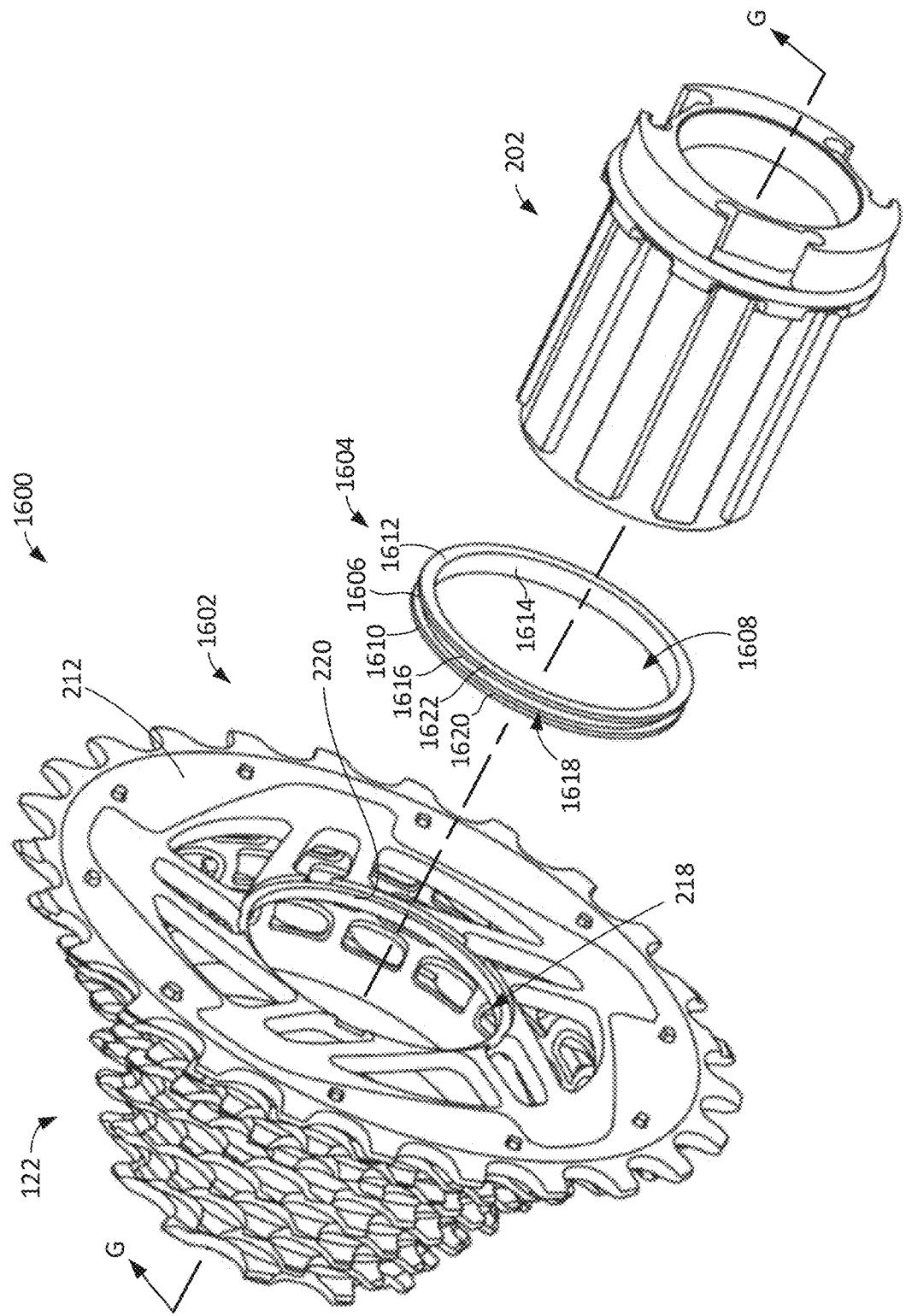
FIG. 16 is an exploded view of another example assembly including an example sprocket assembly with an alternative bushing.

FIG. 16 is an exploded view of another example assembly 1600 that may be implemented in connection with the example bicycle 100 and mounted on the rear hub 126. The assembly 1600 includes a sprocket assembly 1602 with an alternative bushing 1604 that may be used to form a non-torque transmitting interface between the second end 212 of cassette 122 and the driver hub 202. In this example, the bushing 1604 is implemented as a ring 1606 defining an opening 1608 between a first end 1610 and a second end 1612 opposite the first end 1610. The ring 1606 has an inner surface 1614 and an outer surface 1616. The inner surface 1614 and the outer surface 1616 are smooth. In this example, the ring 1606 includes an annular groove 1618. The annular groove 1618 is formed by the outer surface 1616, a first flange 1620 extending radially outward from the outer surface 1616 at the first end 1610, and a second flange 1622 extending radially outward from the outer surface 1616 at the second end 1612. When the ring 1606 is disposed in the second opening 218, the second inner peripheral edge 220 extends into the annular groove 1618.

Figure 17:
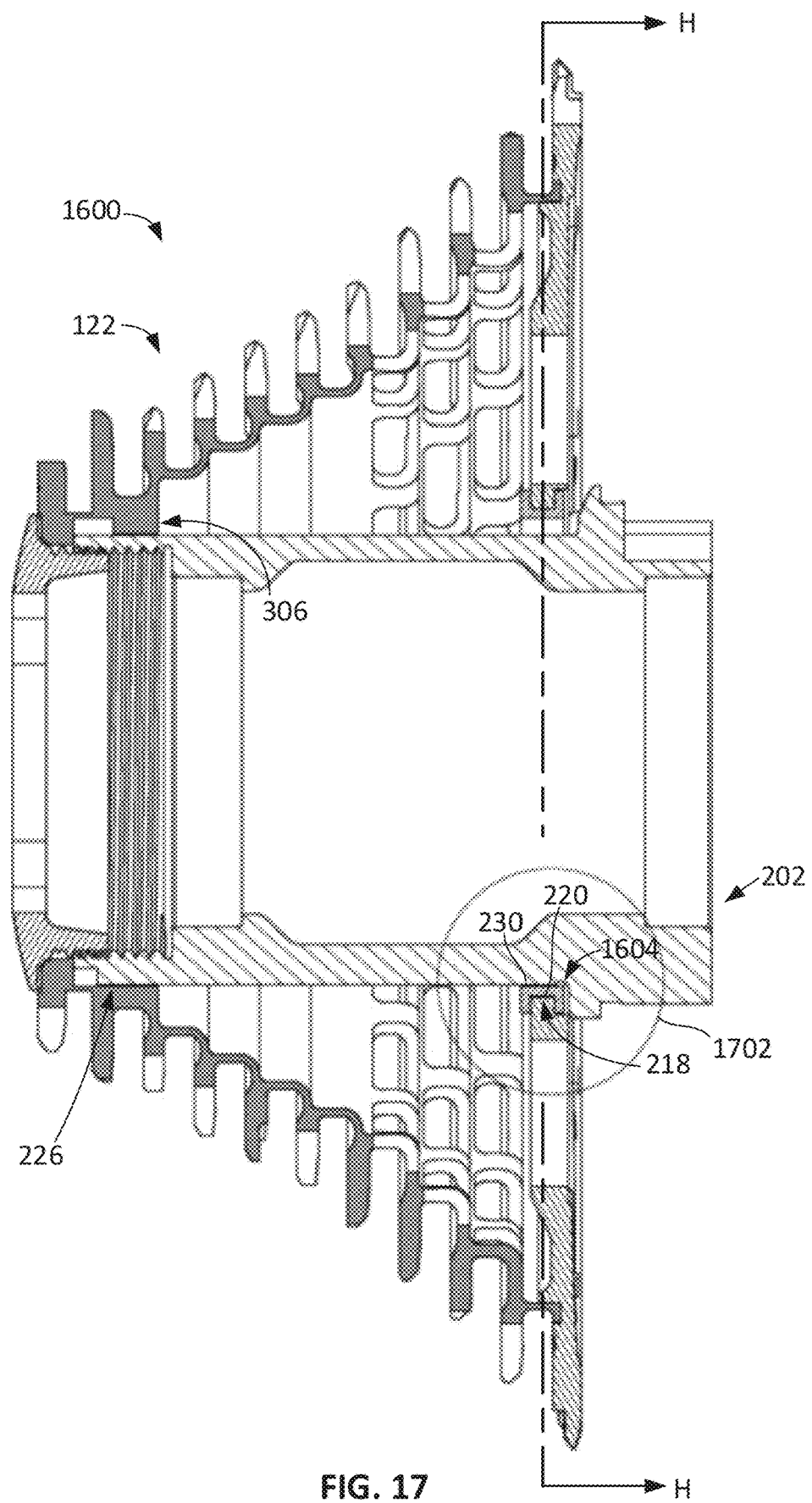
FIG. 17 is a cross-sectional view of the example assembly of FIG. 16 taken along line G-G of FIG. 16.

For example, FIG. 17 is a cross-sectional view of the example assembly 1600 taken along line G-G of FIG. 16. Similar to the bushing 204 of FIG. 2, the bushing 1604 fills the gap between the second inner peripheral edge 220 of the second opening 218 and the outer surface 230 of the driver hub 202. As shown in FIG. 17, the second torque transmitting profile 226 of driver hub 202 extends through the bushing 1604 and is engaged with the first torque transmitting profile 306 of the cassette 122. Thus, torque can be transferred between the cassette 122 and the driver hub 202.

Figure 18:
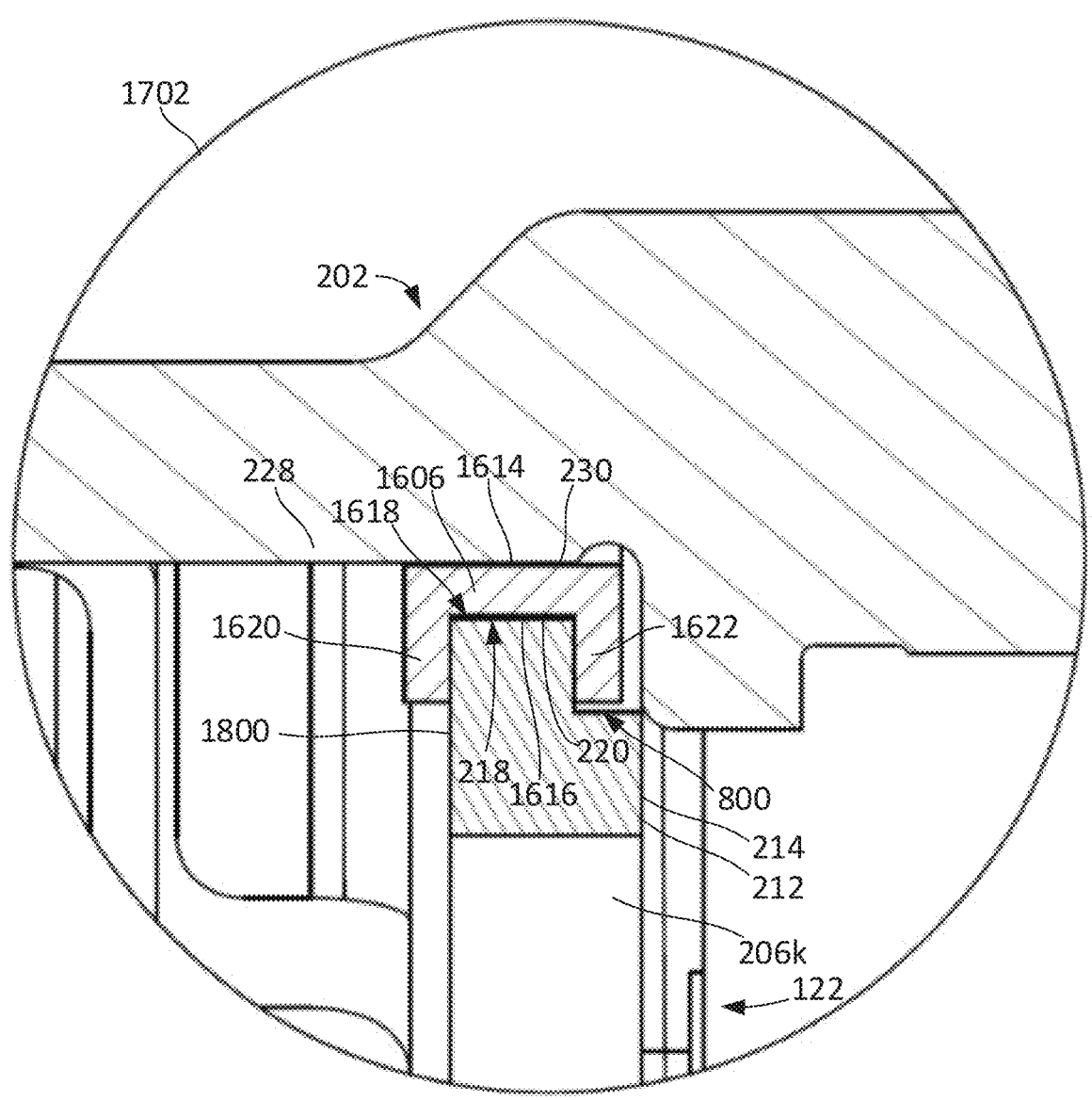
FIG. 18 is an enlarged view of the callout in FIG. 17.

FIG. 18 is an enlarged view of the callout 1702 in FIG. 17. As shown in FIG. 18, the ring 1606 fills the space between the second inner peripheral edge 220 of the second opening 218 and the outer surface 230 of the driver hub 202, thereby reducing or eliminating movement and/or wobble between the driver hub 202 and the cassette 122 at the second end 212. For example, as shown in FIG. 18, the ring 1606 is sized such that the inner surface 1614 is in contact with the outer surface 230 of the splines 228 of the driver hub 202, and the outer surface 1616 is in contact with the second inner peripheral edge 220. As a result, the cassette 122 remains substantially axially aligned on the driver hub 202. Further, as shown in FIG. 18, the second inner peripheral edge 220 extends into the annular groove 1618. The second flange 1622 is disposed in the recess 800 and engaged with the outer surface 214 of the eleventh sprocket 206k, and the first flange 1620 is engaged with an inner surface 1800 of the eleventh sprocket 206k, which prevents the ring 1606 from moving axially and potentially shifting out of the second opening 218. In some examples, the bushing 204 is constructed of a compliant material and is placed in compression between the driver hub 202 and the second inner peripheral edge 220.

Figure 19A:
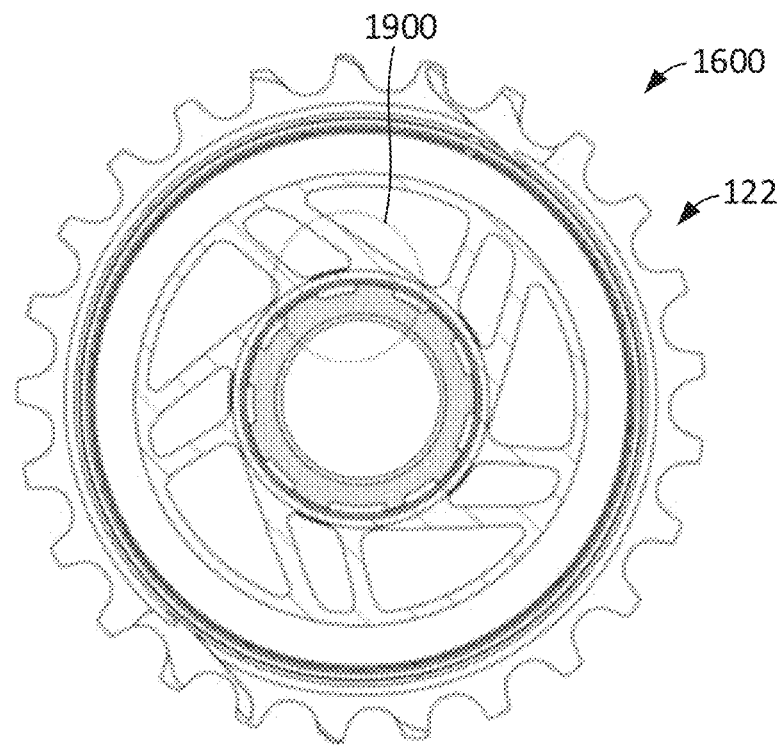
FIG. 19A is a cross-sectional view of the example assembly of FIG. 16 taken along line H-H of FIG. 17.
Figure 19B:
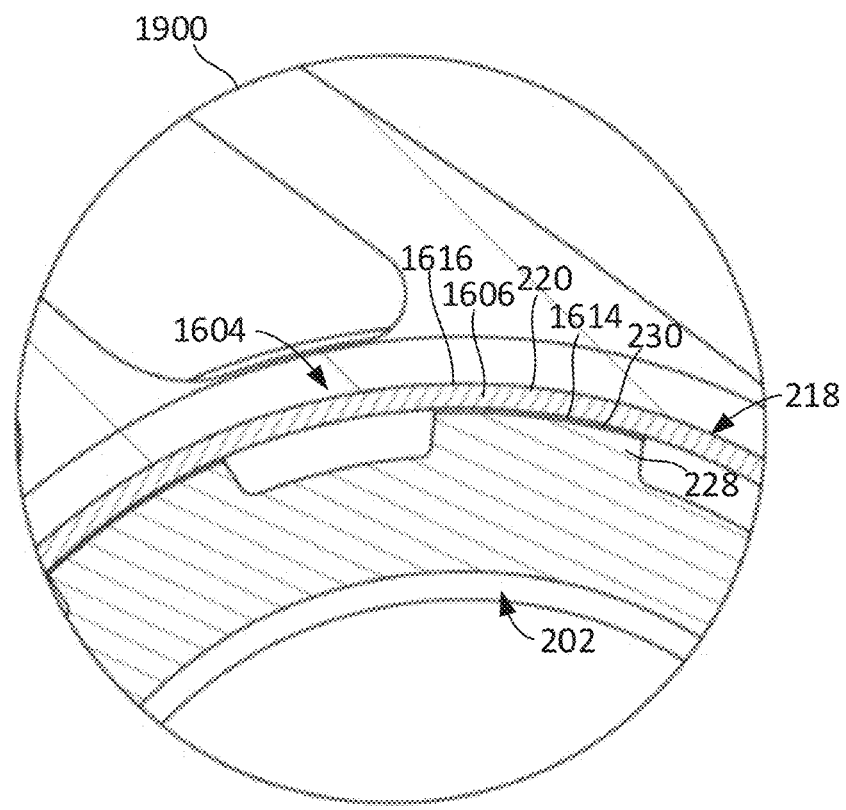
FIG. 19B is an enlarged view of the callout in FIG. 19A.

FIG. 19A is a cross-sectional view of the assembly 1600 taken along line H-H from FIG. 17. An enlarged view of the callout 1900 in FIG. 19A is shown in FIG. 19B. As shown in FIG. 19B, the outer surface 1616 of the ring 1606 is engaged with the second inner peripheral edge 220 of the second opening 218, and the inner surface 1614 of the ring 1606 is engaged with the outer surface 230 of the driver hub 202 (i.e., the outer surfaces of the splines 228). Thus, the bushing 204 provides an interface between the second end 212 (FIG. 16) of the cassette 122 (FIG. 19A) and the driver hub 202. However, because the second inner peripheral edge 220 is smooth and the outer surface 1616 of the ring 1606 is smooth, the interface between the second inner peripheral edge 220 and the ring 1606 does not transfer torque. As such, any torque applied to the cassette 122 (FIG. 19A) is not transferred through the bushing 1604 to the driver hub 202. Instead, the bushing 1604 only helps support and stabilize the cassette 122 (FIG. 19A) on the driver hub 202, while the torque is transferred between the cassette 122 (FIG. 19A) and the driver hub 202 at the interface of the first torque transmitting profile 306 (FIG. 3) and the second torque transmitting profile 226 (FIG. 2), which is at or near the opposite side (the first end 210) of the cassette 122 (FIG. 19A).

Figure 20:
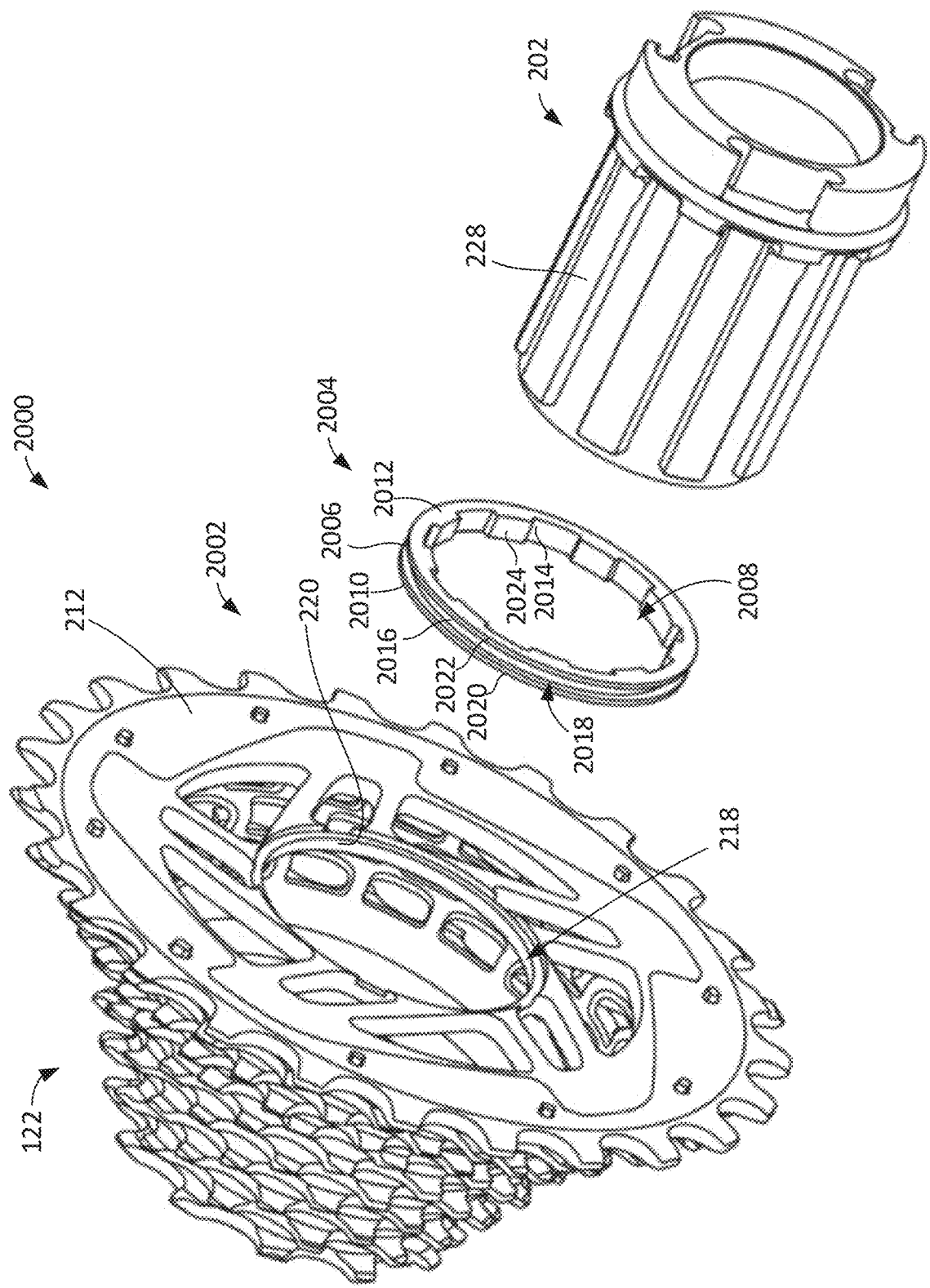
FIG. 20 is an exploded view of another example assembly including an example sprocket assembly with an alternative bushing.

FIG. 20 is an exploded view of another example assembly 2000 that may be implemented in connection with the example bicycle 100 and mounted on the rear hub 126. The assembly 2000 includes a sprocket assembly 2002 with an alternative bushing 2004 that may be used to form a non-torque transmitting interface between the second end 212 of cassette 122 and the driver hub 202. Similar to the bushing 1604 of FIG. 16, the bushing 2004 in this example is implemented as a ring 2006 defining an opening 2008 between a first end 2010 and a second end 2012 opposite the first end 2010. The ring 2006 has an inner surface 2014 and an outer surface 2016. The outer surface 2016 is smooth. The ring 2006 includes an annular groove 2018 formed by the outer surface 2016, a first flange 2020 extending radially outward from the outer surface 2016 at the first end 2010, and a second flange 2022 extending radially outward from the outer surface 2016 at the second end 2012. When the ring 2006 is disposed in the second opening 218, the second inner peripheral edge 220 extends into the annular groove 2018. In this example, the ring 2006 includes splines 2024 (one of which is referenced in FIG. 20) formed in the inner surface 2014. The splines 2024 are sized and shaped to mesh with the splines 228 on the driver hub 202. Therefore, when the driver hub 202 is inserted into the opening 2008 of the ring 2006, the splines 2024 mesh with the splines 228 of the driver hub 202.

In the illustrated examples disclosed herein the second inner peripheral edge 220 and the outer surface of the bushing are smooth (e.g., form a slip fit and do not include a keyed profile). However, in other examples, the second inner peripheral edge 220 and/or the outer surface of the bushing may not be smooth. For example, the second inner peripheral edge 220 and/or the outer surface of the bushing may include a keyed profile, such as splines. In such an example, the inner surface of the bushing and/or the outer surface 230 of the driver hub 202 may be smooth, which forms a slip fit that results in no torque transfer. Further, even if splines or teeth (or another type of profile) are provided on the outer surface of the bushing and/or the second inner peripheral edge 220, as long as the splines do not mesh (e.g., only the ends or tips of the teeth or splines are engaged), no torque is transmitted. In other words, other shapes and profiles can be used to form a slip fit between at the bushing and the second inner peripheral edge 220 and/or between the bushing and the driver hub 202.

From the foregoing, it will be appreciated that the above disclosed bushings or spacers introduce stability into a sprocket assembly where one end (or an area near an end) of a cassette is used to transmit torque to a driver hub. The example bushings fill the space or gap between the drive hub and the non-torque transmitting side of the cassette, thereby reducing or eliminating movement between the non-torque transmitting side of the cassette. As such, the example bushings reduce or eliminate wear and/or damage to the sprocket assembly and/or other components of a bicycle. Thus, the example bushings increase safety and increase the life span of the sprocket assembly and/or other components of a bicycle.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

What is claimed is:

1. A sprocket assembly comprising:
   a cassette formed by a plurality of sprockets arranged in increasing diameter order from a first end of the cassette to a second end of the cassette opposite the first end, the cassette having a passageway extending between a first opening in the first end and a second opening in the second end to receive a driver hub, the first and second openings being coaxial with a central axis of the cassette, an outboard portion of the passageway formed between a midpoint of the cassette and the first end of the cassette, and an inboard portion of the passageway formed between the midpoint of the cassette and the second end of the cassette, the cassette including a torque transmitting profile located within the outboard portion of the passageway to interface with the driver hub; and
   a bushing to be disposed within the second opening to form a non-torque transmitting and non-rotating interface between the second end of the cassette and the driver hub.

2. The sprocket assembly of claim 1, wherein the bushing is an elongated sleeve having an inner surface and an outer surface.

3. The sprocket assembly of claim 2, wherein the sleeve has a first end and a second end opposite the first end, the sleeve including a flange extending radially outward from the outer surface at the second end, the flange to engage the second end of the cassette to prevent the sleeve from moving toward the first end of the cassette.

4. The sprocket assembly of claim 3, wherein the inner surface of the sleeve is smooth.

5. The sprocket assembly of claim 3, wherein the inner surface of the sleeve includes splines to engage splines on the driver hub.

6. The sprocket assembly of claim 2, wherein the outer surface of the sleeve is smooth and the inner surface of the sleeve is smooth.

7. The sprocket assembly of claim 2, wherein the outer surface of the sleeve is smooth, and the inner surface of the sleeve includes splines to engage splines on the driver hub.

8. The sprocket assembly of claim 1, wherein the bushing is a ring having an inner surface and an outer surface.

9. The sprocket assembly of claim 8, wherein the outer surface of the ring includes an annular groove, the second opening in the second end of the cassette defined by an inner peripheral edge, the inner peripheral edge to be disposed in the annular groove.

10. The sprocket assembly of claim 9, wherein the inner surface of the ring is smooth.

11. The sprocket assembly of claim 9, wherein the inner surface of the ring includes splines to engage splines on the driver hub.

12. The sprocket assembly of claim 1, wherein the bushing is constructed of a compliant material.

13. The sprocket assembly of claim 1, wherein the cassette is formed by a single-piece conical shell and an end sprocket coupled to a large end of the single-piece conical shell, the single-piece conical shell including a subset of the plurality of sprockets, the end sprocket forming the second end of the cassette.

14. The sprocket assembly of claim 1, wherein at least a portion of the sprockets are coupled without the use of fasteners.

15. An assembly to be mounted on a hub of bicycle, the assembly comprising:
a sprocket assembly including:
a cassette formed by a plurality of sprockets arranged in increasing diameter order, the cassette having a passageway formed between a first opening in a first end of the cassette and a second opening in a second end of the cassette opposite the first end, the first and second openings being coaxial with a central axis of the cassette, the second opening in the second end of the cassette defined by an inner peripheral edge, the cassette including a first keyed profile within the passageway to interface with a second keyed profile of a driver hub, the first keyed profile located at or near the first opening; and
a bushing to be disposed within the second opening to form a non-rotating interface between the second end of the cassette and the driver hub, the bushing having a channel to receive the driver hub, an outer surface of the bushing and inner peripheral edge being smooth.

16. The assembly of claim 15, wherein the bushing is shorter than a distance between the second end of the cassette and the first keyed profile.

17. The assembly of claim 15, wherein the second end corresponds to a largest diameter sprocket of the cassette.

18. The assembly of claim 15, further including the driver hub, the driver hub including the second keyed profile, the driver hub to extend through the bushing in the second opening and engage the first keyed profile in the passageway.

19. An assembly to be mounted on a hub of bicycle, the assembly comprising:
a driver hub having an outer surface; and
a sprocket assembly to transfer torque to the hub of the bicycle: via the outer surface of the driver hub, the sprocket assembly including:
a cassette formed by a plurality of sprockets, the cassette having a passageway formed between a first opening in a first end of the cassette and a second opening in a second end of the cassette opposite the first end, the driver hub disposed within the passageway, the passageway including a torque transmitting profile that mates with the outer surface of the driver hub, the second opening defined by an inner peripheral edge, a diameter of the second opening being larger than a diameter of the outer surface along a section of the driver hub disposed within the second opening such that a space is formed between the inner peripheral edge and the outer surface of the driver hub; and
means for filling at least some of the space between the inner peripheral edge of the second end and the outer surface of the driver hub to form a non-rotating interface between the second end of the cassette and the driver hub.

20. The assembly of claim 19, wherein the means for filling is a compliant material.

* * * * *